(12) United States Patent
Raghothaman

(10) Patent No.: US 11,812,317 B2
(45) Date of Patent: Nov. 7, 2023

(54) SELECTIVE TRANSMISSION AND RECEPTION IN CENTRALIZED RADIO ACCESS NETWORK (C-RAN) EMPLOYING BEAMFORMING

(71) Applicant: CommScope Technologies LLC, Hickory, NC (US)

(72) Inventor: Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 158 days.

(21) Appl. No.: 17/182,488

(22) Filed: Feb. 23, 2021

(65) Prior Publication Data
US 2021/0274405 A1  Sep. 2, 2021

Related U.S. Application Data

(60) Provisional application No. 63/148,491, filed on Feb. 11, 2021, provisional application No. 62/982,590, filed on Feb. 27, 2020.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0085* (2018.08); *H04W 36/06* (2013.01); *H04W 36/30* (2013.01)

(58) Field of Classification Search
CPC ..... H04W 36/08; H04W 36/00; H04W 36/06; H04W 36/30; H04W 24/10; H04W 88/08;
(Continued)

(56) References Cited

U.S. PATENT DOCUMENTS 9,380,466 B2  6/2016 Eyuboglu et al.
9,414,399 B2  8/2016 Eyuboglu et al.
(Continued)

FOREIGN PATENT DOCUMENTS

WO  2016145371 A2  9/2016
WO  2017070635 A1  4/2017
WO  2018017468 A1  1/2018

OTHER PUBLICATIONS

Ericsson, "Common Public Radio Interface: eCPRI Interface Specification", eCPRI Specification V2.0, May 10, 2019, pp. 1 through 109, Ericsson AB, Huawei Technologies Co. Ltd, NEC Corporation and Nokia.
(Continued)

*Primary Examiner* — Walli Z Butt
(74) *Attorney, Agent, or Firm* — Fogg & Powers LLC

(57) ABSTRACT

In one embodiment, a system comprises a distributed unit (DU) and a plurality of remote units (RUs). All of the RUs are used to serve the same cell. The system can be configured to wirelessly transmit at least some user data to a first user device using a first subset of the RUs and a first beam, where the first subset of the RUs includes less than all of the RUs otherwise used to serve the same cell. In such an embodiment, the system can be configured to determine which RUs are included in the first subset of RUs used to transmit said at least some user data to the first user device based on measurement reports made by the first user device of reference signal transmissions transmitted using multiple beams, where at least some of the reference signal transmissions are transmitted from less than all of the RUs.

76 Claims, 14 Drawing Sheets

(51) Int. Cl.
*H04W 36/30* (2009.01)
*H04W 36/06* (2009.01)

(58) Field of Classification Search
CPC ............. H04W 36/0085; H04W 24/02; H04W 88/085; H04B 7/022; H04B 7/06; H04B 24/02; H04B 7/061; H04B 7/0691; H04B 7/0617

See application file for complete search history.

(56) References Cited

U.S. PATENT DOCUMENTS

| | | | |
|---|---|---|---|
| 9,936,470 B2 | 4/2018 | Eyuboglu et al. | |
| 9,998,310 B2 | 6/2018 | Barbieri et al. | |
| 10,057,916 B2 | 8/2018 | Barabell et al. | |
| 10,097,391 B2 | 10/2018 | Fertonani et al. | |
| 10,355,895 B2 | 7/2019 | Barbieri et al. | |
| 2016/0037550 A1* | 2/2016 | Barabell | H04B 17/318 455/450 |
| 2016/0135227 A1 | 5/2016 | Hahn et al. | |
| 2016/0262077 A1 | 9/2016 | Zhang et al. | |
| 2016/0365957 A1* | 12/2016 | Lee | H04L 5/0023 |
| 2017/0373890 A1 | 12/2017 | Fertonani et al. | |
| 2018/0159604 A1* | 6/2018 | Won | H04B 7/0417 |
| 2018/0242349 A1* | 8/2018 | Noh | H04L 69/22 |
| 2018/0287696 A1 | 10/2018 | Barbieri et al. | |
| 2019/0007246 A1 | 1/2019 | Fertonani et al. | |
| 2019/0116568 A1 | 4/2019 | Fertonani et al. | |
| 2019/0208575 A1 | 7/2019 | Barbieri et al. | |
| 2019/0260461 A1* | 8/2019 | Kim | H04B 7/15592 |
| 2020/0007207 A1 | 1/2020 | Liang et al. | |
| 2021/0007039 A1* | 1/2021 | Salahuddeen | H04W 72/005 |
| 2021/0037444 A1* | 2/2021 | Harel | H04W 72/042 |
| 2021/0057802 A1* | 2/2021 | Guri | H01Q 1/246 |
| 2021/0058140 A1* | 2/2021 | Schwab | H04B 7/022 |

OTHER PUBLICATIONS

Haberland et al., "Base Stations in the Cloud", Sep. 28, 2012, pp. 1 through 23, Alcatel-Lucent.

O-RAN, "O-RAN Fronthaul Working Group Control, User and Synchronization Plane Specification", O-RAN.WG4.CUS.0-v03.00 Technical Specification, at least as early as May 1, 2020, O-RAN Alliance.

Zhu et al., "Virtual Base Station Pool: Towards A Wireless Network Cloud for Radio Access Networks", CF' 10, May 2010, pp. 1 through 10, Bertinoro, Italy.

International Searching Authority, "International Search Report and Written Opinion from PCT Application No. PCT/US2021/019171", from Foreign Counterpart to U.S. Appl. No. 17/182,488, dated Jun. 11, 2021, pp. 1 through 14, Published: WO.

* cited by examiner

SELECTIVE TRANSMISSION AND RECEPTION IN CENTRALIZED RADIO ACCESS NETWORK (C-RAN) EMPLOYING BEAMFORMING

CROSS-REFERENCE TO RELATED APPLICATIONS

This application claims the benefit of U.S. Provisional Patent Application Ser. No. 62/982,590, filed on Feb. 27, 2020, and U.S. Provisional Patent Application Ser. No. 63/148,491, filed on Feb. 11, 2021, all of which are hereby incorporated herein by reference in its entirety.

BACKGROUND

A centralized radio access network (C-RAN) can be used to implement base station functionality that is used to provide wireless service to items of user equipment (UE). Typically, for each cell implemented by a C-RAN, one or more baseband units (BBUs) interact with multiple remote units (RUs). Each BBU is coupled to the RUs over fronthaul communication links or a fronthaul network.

As used here, "reuse" refers to situations where a C-RAN serving a cell simultaneously transmits separate data to, or receives separate data from, multiple UEs using the same time-frequency resources. To do this, each of the multiple UEs is served by a different set of RUs. Situations where reuse can be used typically arise when the UEs are sufficiently physically separated from each other so that the different wireless transmissions do not significantly interfere with each other. This type of reuse has historically been used with C-RAN systems that support Fourth Generation wireless standards (such as Long Term Evolution (LTE)).

C-RAN systems that support this type of reuse have typically not taken into account any beamforming used to wirelessly communicate with UEs.

SUMMARY

One embodiment is directed to a system for providing wireless service to user devices using a same cell. The system comprises a distributed unit (DU) to communicatively couple the system to a core network. The DU is configured to implement at least some LAYER 2 functions for a wireless interface and at least some LAYER 1 functions for the wireless interface. The system further comprises a plurality of remote units (RUs), each of the RUs associated with a respective set of one or more antennas. The system is configured to use all of the RUs to serve the same cell. The system is configured to wirelessly transmit at least some user data to a first user device using a first subset of the RUs and a first beam, the first subset of the RUs including less than all of the RUs otherwise used to serve the same cell. The system is configured to determine which RUs are included in the first subset of RUs used to transmit said at least some user data to the first user device based on measurement reports made by the first user device of reference signal transmissions transmitted using multiple beams, at least some of the reference signal transmissions transmitted from less than all of the RUs.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of user devices using the wireless interface and using beamforming. Each of the RUs is associated with a respective set of one or more antennas. Each RU is configured to implement the LAYER 1 functions for the wireless interface that are not implemented in the DU. The DU and RUs are communicatively coupled to each other over a fronthaul. The system is configured to use all of the RUs to serve the same cell. The method comprises transmitting reference signals using multiple beams, at least some of the reference signals transmitted from less than all of the RUs. The method further comprises receiving measurement reports made by a first user device of the reference signal and determining which RUs are included in a first subset of RUs, the first subset of the RUs including less than all of the RUs otherwise used to serve the same cell. The method further comprises wirelessly transmitting at least some user data to the first user device using the first subset of the RUs and a first beam.

Another embodiment is directed to a system for providing wireless service to user devices using a same cell. The system comprises a distributed unit (DU) to communicatively couple the system to a core network. The DU is configured to implement at least some LAYER 2 functions for a wireless interface and at least some LAYER 1 functions for the wireless interface. The system further comprises a plurality of remote units (RUs), each of the RUs associated with a respective set of one or more antennas. The system is configured to use all of the RUs to serve the same cell. The system is configured to wirelessly receiving at least some user data from a first user device using a first subset of the RUs and a first beam, the first subset of the RUs including less than all of the RUs otherwise used to serve the same cell. The system is configured to determine which RUs are included in the first subset of RUs used to receive said at least some user data from the first user device based on measurement reports made by the first user device of reference signal transmissions transmitted using multiple beams, at least some of the reference signal transmissions transmitted from less than all of the RUs.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of user devices using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The system is configured to use all of the RUs to serve the same cell. The method comprises transmitting reference signals using multiple beams, at least some of the reference signals transmitted from less than all of the RUs. The method further comprises receiving measurement reports made by a first user device of the reference signals and determining which RUs are included in a first subset of RUs, the first subset of the RUs including less than all of the RUs otherwise used to serve the same cell. The method further comprises wirelessly receiving at least some user data from the first user device using the first subset of the RUs and a first beam.

Another embodiment is directed to a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The DU is configured to determine a serving set of RUs that should be used to serve each of the UEs when beamforming is used. The system is configured to simultaneously communicate with multiple UEs using the same time-frequency resources. The system is configured to determine if a reuse set of UEs can be scheduled to use the same time-frequency resources based on the respective serving set of RUs used to serve each UE included in said reuse set of UEs and the respective beam used to serve each UE included in said reuse set of UEs.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The method comprises scheduling a UE to make a set of reference signal transmissions and measuring, at each of a candidate set of two or more of the RUs, a respective received signal strength of each of the reference signal transmissions from said UE received using a respective at least one of a set of multiple beams and determining, using the received signal strength measurements, a serving set of one or more of the RUs and a beam to serve said UE.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The method comprises scheduling a UE to make a reference signal transmission, measuring, at each of a candidate set of two or more of the RUs, a respective received signal strength of the reference signal transmission from said UE received using an omni-directional or wide beam, and determining, using the received signal strength measurements, a serving set of one or more of the RUs to serve said UE.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming. Each of the RUs is associated with a respective set of one or more antennas. Each RU is configured to implement the LAYER 1 functions for the wireless interface that are not implemented in the DU. The DU and RUs are communicatively coupled to each other over a fronthaul. The method comprises scheduling a UE to make a reference signal transmission using a directional transmission in a same direction as a beam for which said UE reported a highest received signal strength during a most-recent beam-sweeping process, measuring, at each of a candidate set of two or more of the RUs, a respective received signal strength of the reference signal transmission from said UE received using an omni-directional or wide beam, and determining, using the received signal strength measurements, a serving set of one or more of the RUs to serve said UE.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The method comprises scheduling each of a candidate set of two or more of the RUs to make reference signal transmissions using a set of multiple beams during time-frequency resources in which only that RU makes the reference signal transmissions, instructing a UE to separately report signal strength measurements of the reference signal transmissions from the RUs in the candidate set, receiving, at the system, the separate measurement reports from said UE made by said UE for the reference signal transmissions, and determining, using the measurements reports, a serving set of one or more of the RUs and a beam to serve said UE.

Another embodiment is directed to a method performed using a system comprising a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from a plurality of items of user equipment (UEs) using the wireless interface and using beamforming, each of the RUs associated with a respective set of one or more antennas. Each RU is configured to implement the LAYER 1 functions for the wireless interface that are not implemented in the DU. The DU and RUs are communicatively coupled to each other over a fronthaul. The method comprises assigning, to each UE included in a set of UEs, a respective RU-beam tuple that comprises a respective set of RUs used to serve that UE and a respective beam used to serve that UE. The method further comprises determining if said set of UEs can be scheduled to use the same time-frequency resources by doing the following: determining if any UE included in said set of UEs has a RU-beam tuple assigned to that UE that is also assigned to one or more other UEs included in said set of UEs, wherein any UEs included in said set of UEs having the same RU-beam tuple assigned to those UEs cannot be scheduled to use the same time-frequency resources; if none of said set of UEs have the same RU-beam tuple assigned thereto, determining if the respective beam assigned to any of said set of UEs intersects the beam assigned to any of the other UEs included in said set of UEs, wherein any UEs included in said set of UEs having intersecting beams assigned thereto cannot be scheduled to use the same time-frequency resources; if none of said set of UEs have intersecting beams assigned thereto: determining if any UE included in said set of UEs has a RU assigned thereto that is also assigned to one or more other UEs included in said set of UEs; and if any UE included in said set of UEs has a RU assigned thereto that is also assigned to one or more other UEs included in said set of UEs, determining if that RU is capable of simultaneously transmitting to all of the UEs included in said set of UEs having that UE assigned thereto. If it is determined that none of the UEs included in said set of UEs have the same RU assigned thereto, said set of UEs can be scheduled to use the same time-frequency resources. If a UE included in said set of UEs has a RU assigned thereto that is also assigned to one or more other UEs included in said set of UEs and that RU is capable of simultaneously transmitting to all of the UEs having that RU assigned thereto, said set of UEs can be scheduled to use the same time-frequency resources. Otherwise the UEs having the same RUs assigned thereto cannot be scheduled to use the same time-frequency resources.

Other embodiments are disclosed.

The details of various embodiments are set forth in the accompanying drawings and the description below. Other features and advantages will become apparent from the description, the drawings, and the claims.

DRAWINGS

Figure 4:
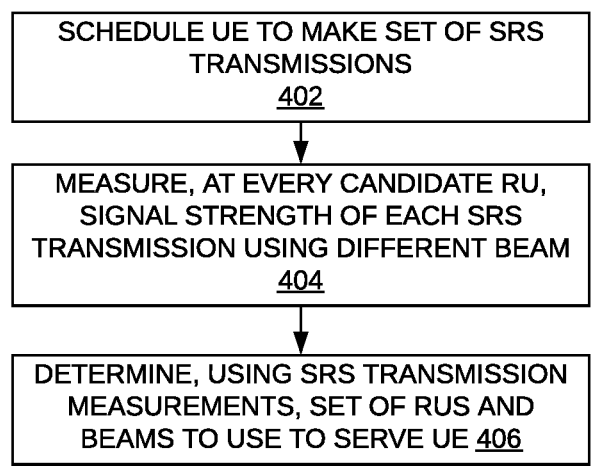

FIG. 4 comprises a high-level flowchart illustrating one exemplary embodiment of a method of determining the set of RUs that should be used to serve a UE when beamforming is used as well as the beam each of the set of serving RUs should use to serve the UE.

Figure 5:
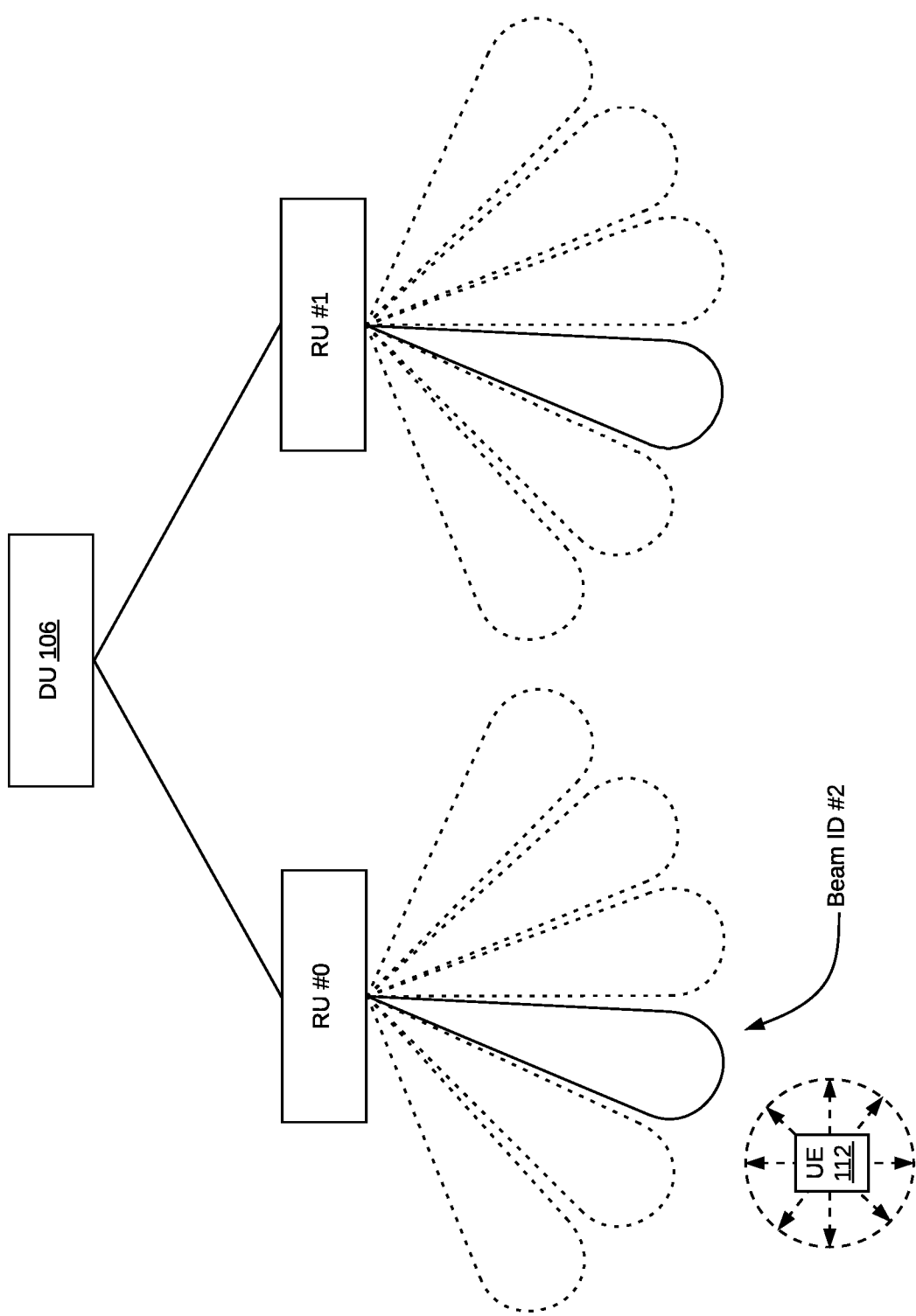

FIG. 5 illustrates one example of the operation of the method shown in FIG. 4.

Figure 6:
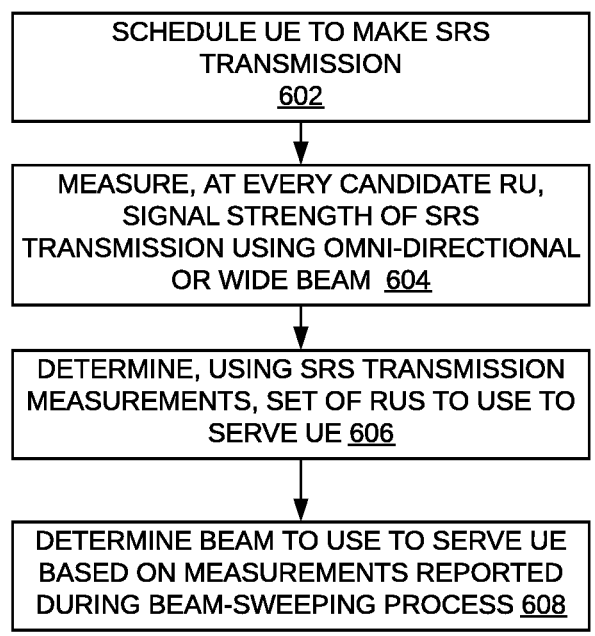

FIG. 6 comprises a high-level flowchart illustrating one exemplary embodiment of a method of determining the set of RUs that should be used to serve a UE when beamforming is used as well as determining the beam each of the set of serving RUs should use to serve the UE.

Figure 7:
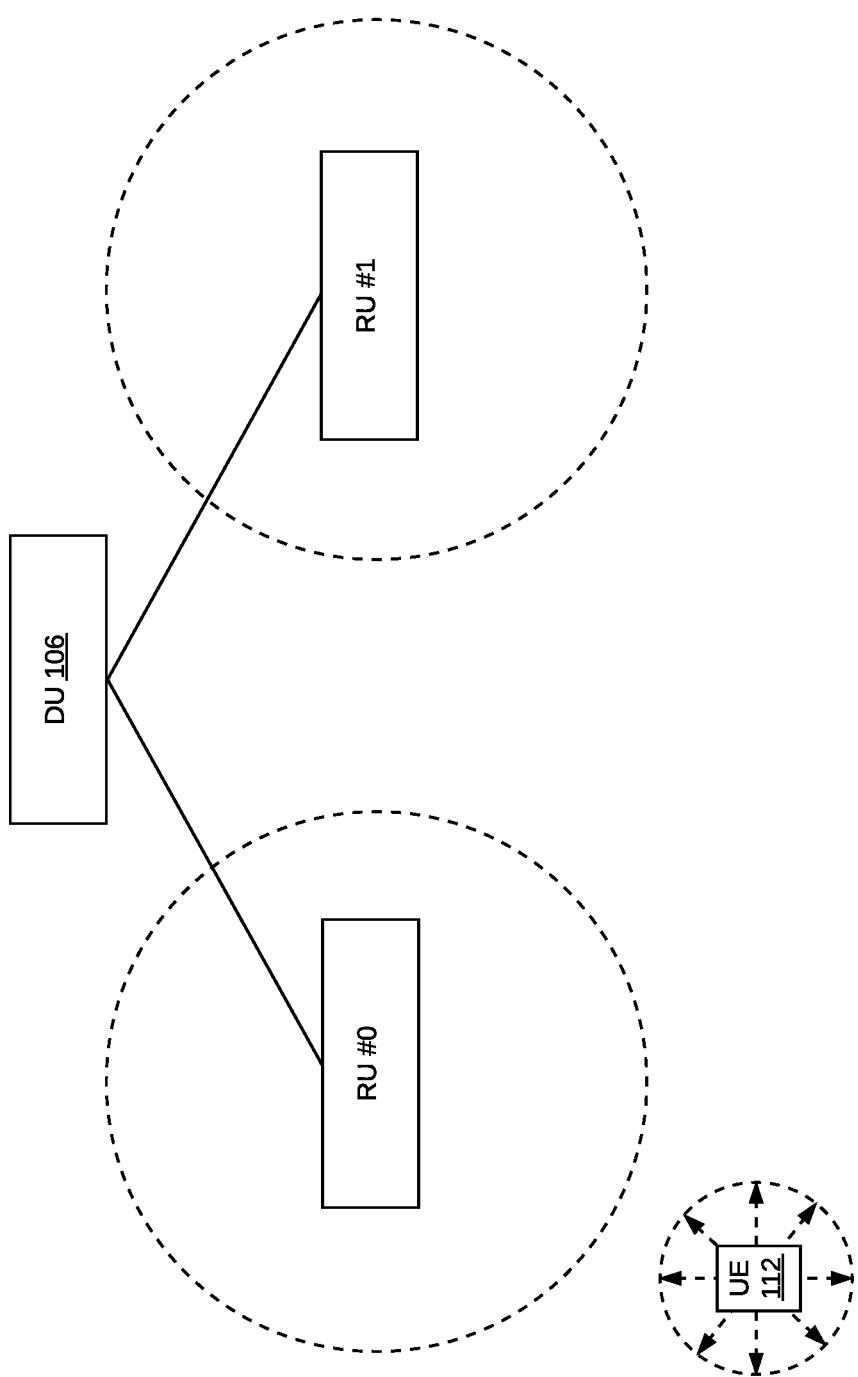

FIG. 7 illustrates one example of the operation of the method shown in FIG. 6.

Figure 8:
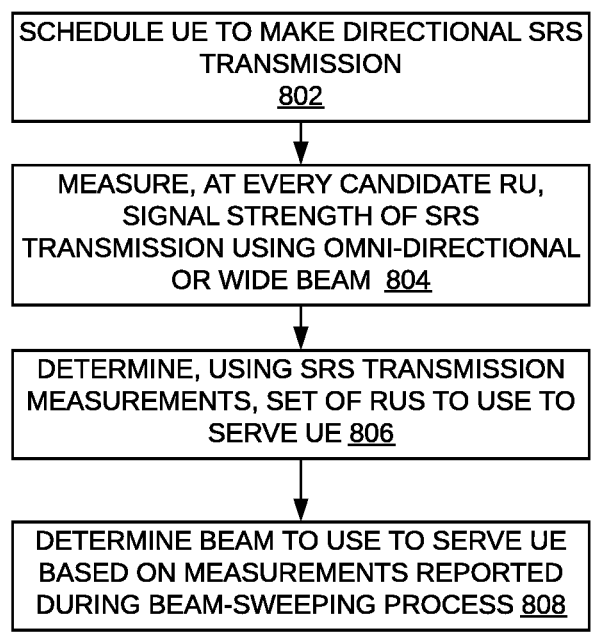

FIG. 8 comprises a high-level flowchart illustrating one exemplary embodiment of a method of determining the set of RUs that should be used to serve a UE when beamforming is used.

Figure 9:
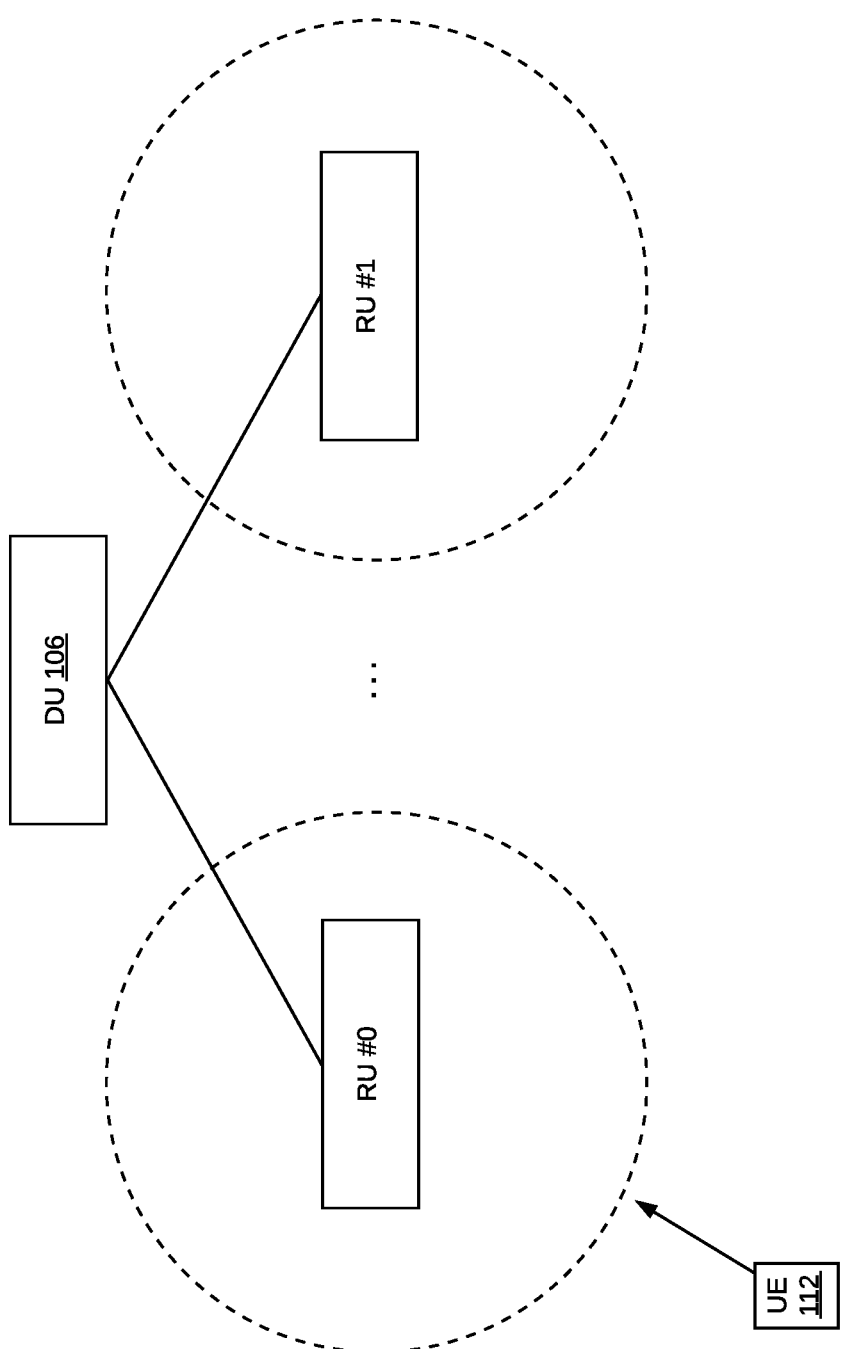

FIG. 9 illustrates one example of the operation of the method shown in FIG. 8.

Figure 10:
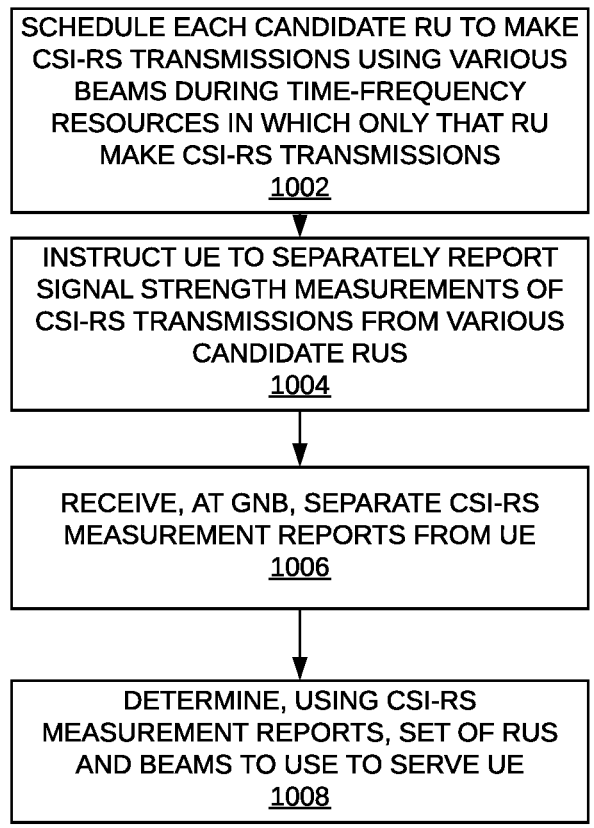

FIG. 10 comprises a high-level flowchart illustrating one exemplary embodiment of a method of determining the set of RUs that should be used to serve a UE when beamforming is used as well as the beam each of the set of serving RUs should use to serve the UE.

Figure 11:
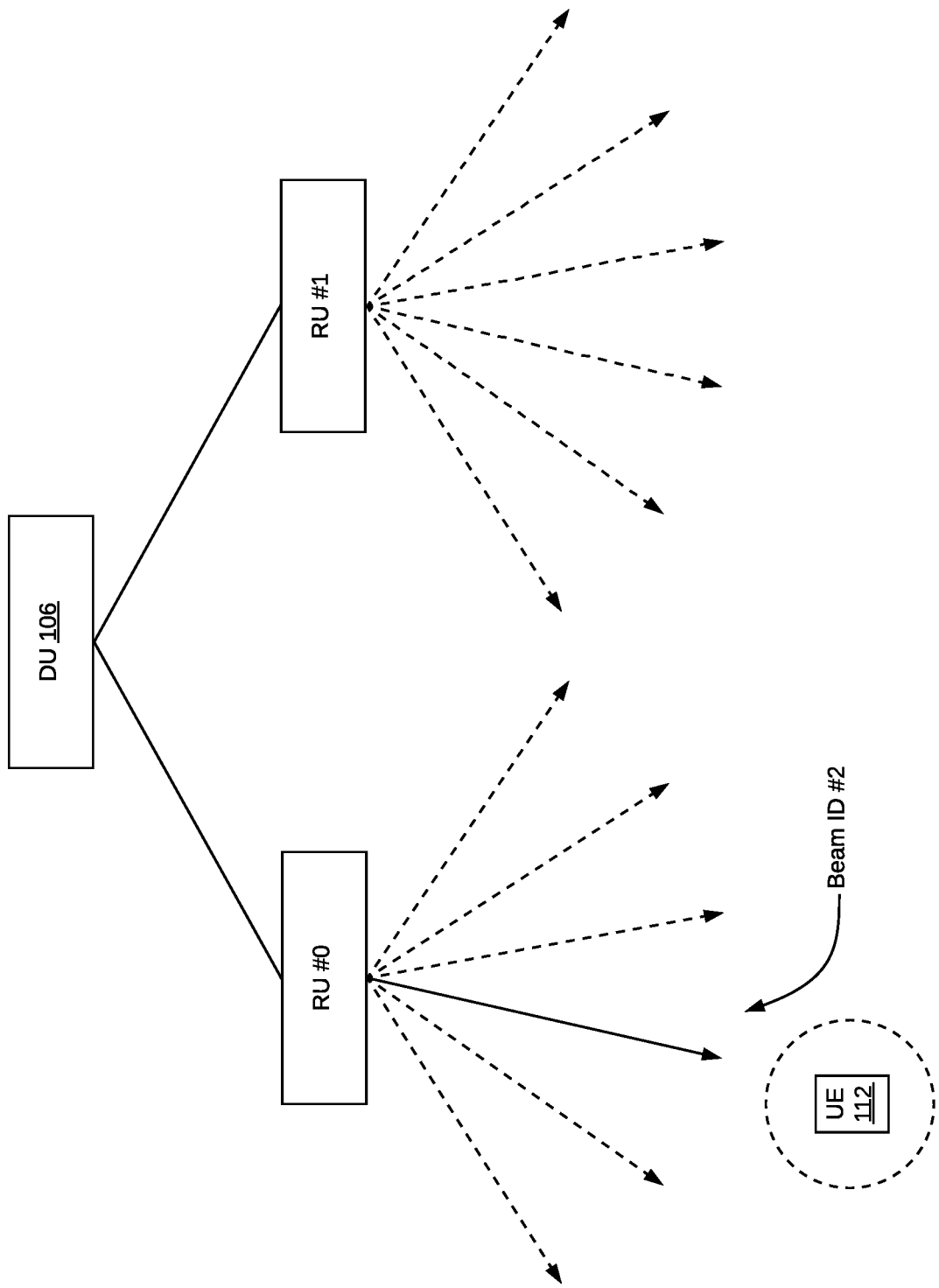

FIG. 11 illustrates one example of the operation of the method shown in FIG. 10.

Figure 12:
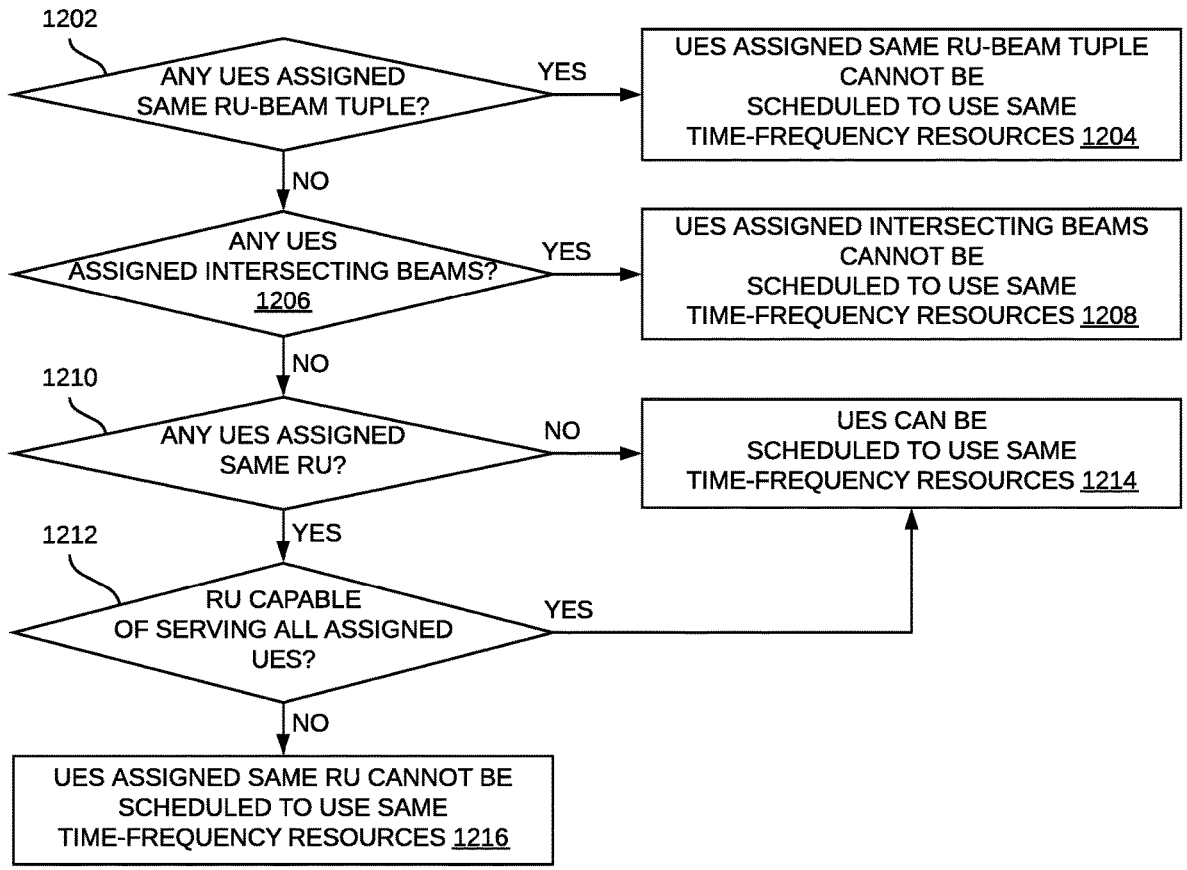

FIG. 12 comprises a high-level flowchart illustrating one exemplary embodiment of a method of employing reuse in a multi-RU gNB.

Figure 13A:
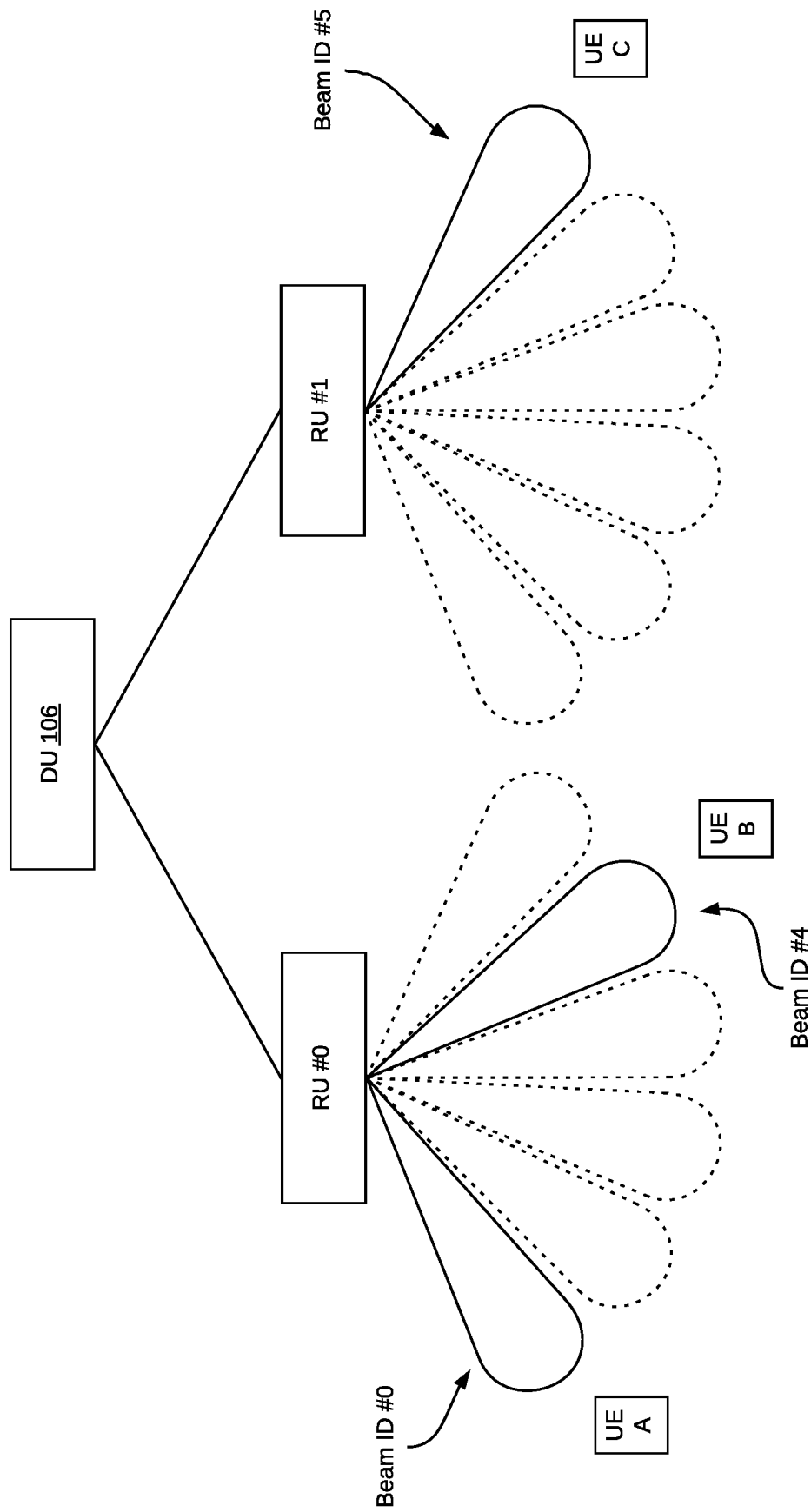
Figure 13B:
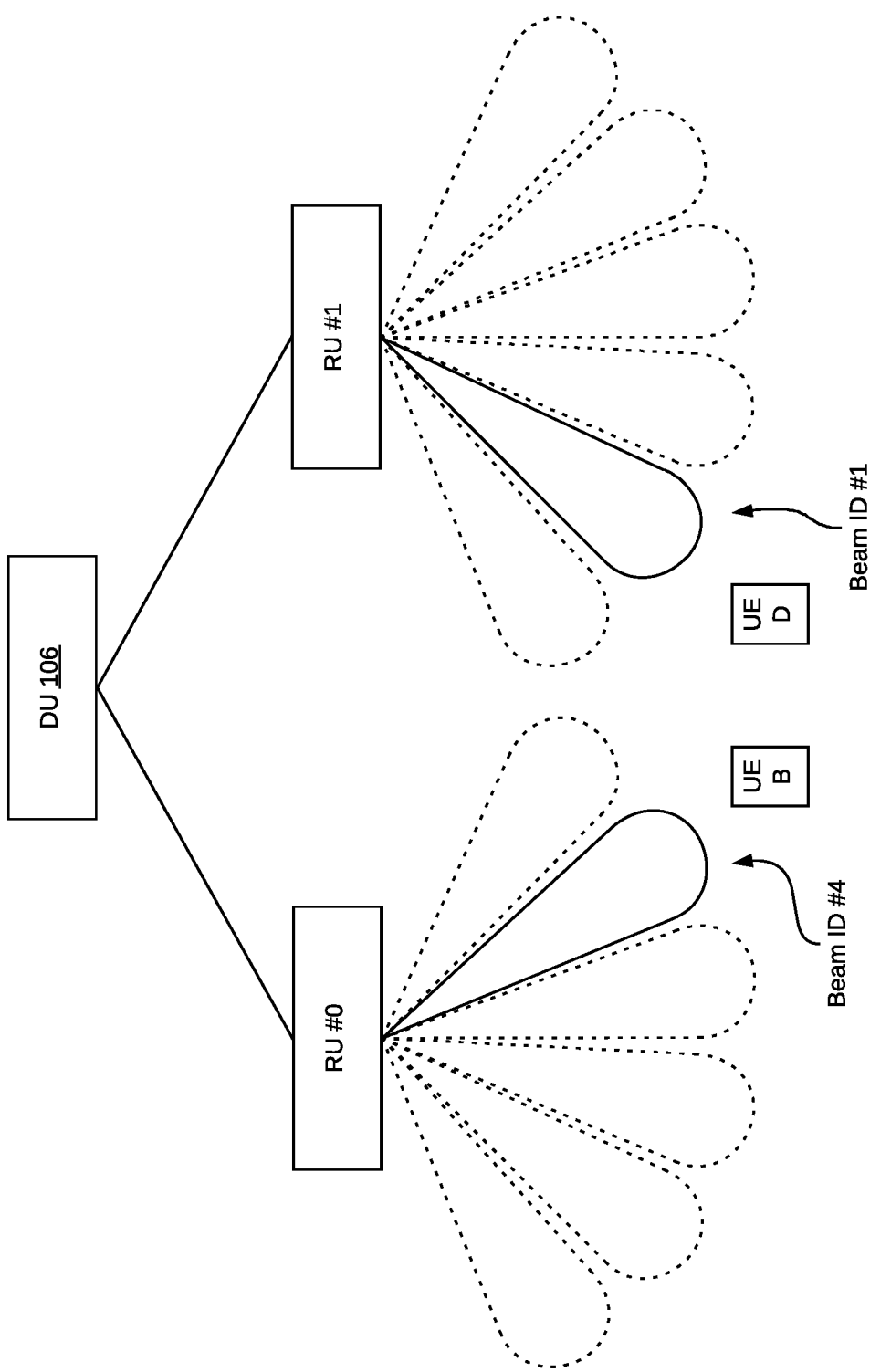

FIGS. 13A-13B illustrate examples of the operation of the method shown in FIG. 12.

Like reference numbers and designations in the various drawings indicate like elements.

DETAILED DESCRIPTION

Figure 1:
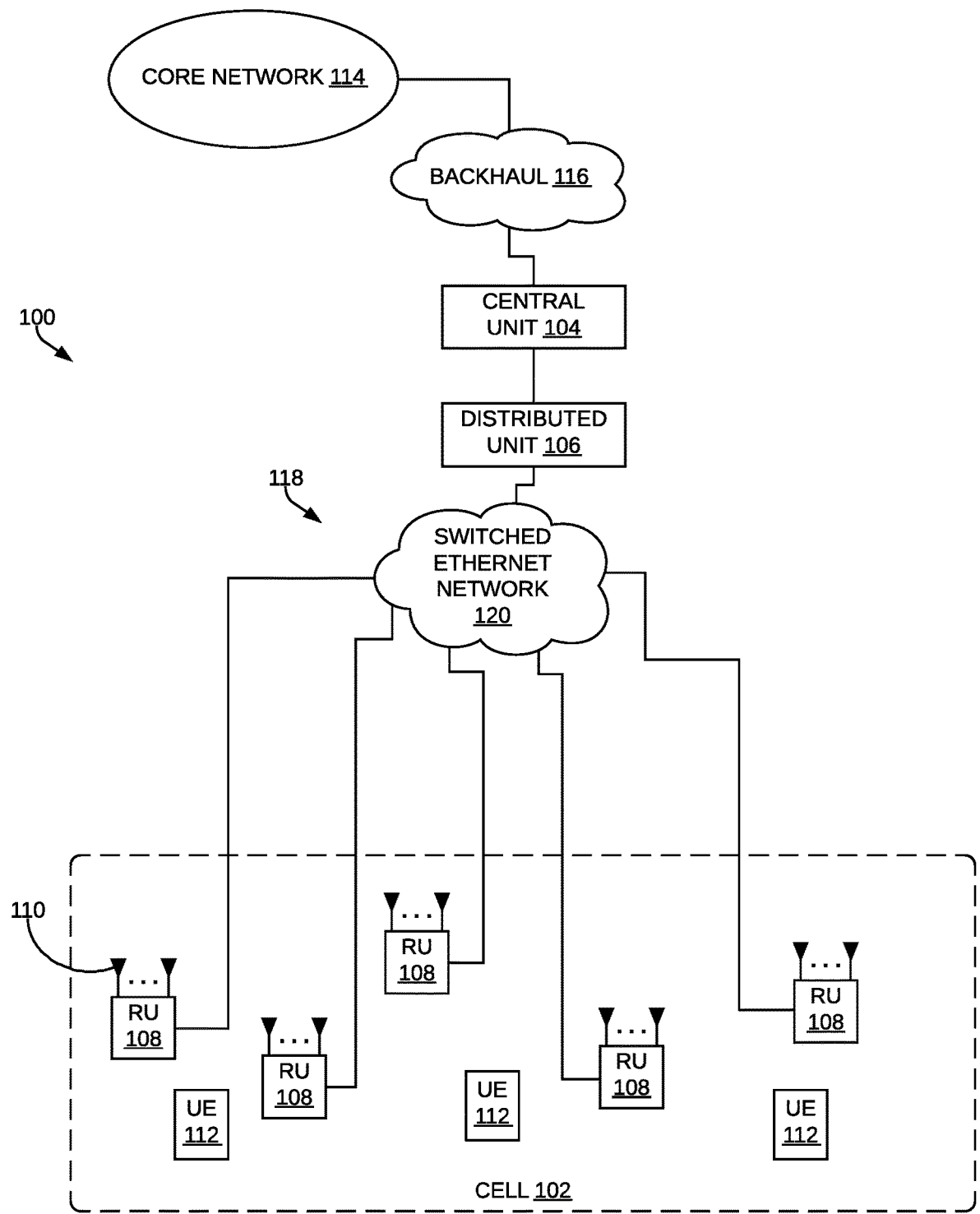
FIG. 1 is a block diagram illustrating one exemplary embodiment of a radio access network (RAN) system in which the techniques described here for implementing reuse with beamforming can be used.

FIG. 1 is a block diagram illustrating one exemplary embodiment of a radio access network (RAN) system 100 in which the techniques described here for implementing reuse with beamforming can be used. The RAN system 100 shown in FIG. 1 implements a base station. The RAN system 100 can also be referred to here as a "base station" or "base station system."

In the exemplary embodiment shown in FIG. 1, the system 100 is implemented at least in part using a centralized or cloud RAN (C-RAN) architecture that employs, for each cell (or sector) 102 served by the system 100, the following logical nodes: at least one control unit (CU) 104, at least one at least one distributed unit (DU) 106, and multiple remote units (RUs) 108. The system 100 is also referred to here as a "C-RAN system" 100. Each RU 108 is remotely located from each CU 104 and DU 106 serving it. Also, in this exemplary embodiment, at least one of the RUs 108 is remotely located from at least one other RU 108 serving that cell 102.

The RAN system 100 can be implemented in accordance with one or more public standards and specifications. In the exemplary embodiment described here in connection with FIG. 1, the RAN system 100 is implemented using the logical RAN nodes, functional splits, and fronthaul interfaces defined by the O-RAN Alliance. In such an O-RAN example, each CU 104, DU 106, and RU 108 can be implemented as an O-RAN control unit (CU), O-RAN distributed unit (DU), and O-RAN remote unit (RU), respectively, in accordance with the O-RAN specifications. That is, each CU 104 comprises a logical node hosting Packet Data Convergence Protocol (PDCP), Radio Resource Control (RRC), Service Data Adaptation Protocol (SDAP), and other control functions. Each DU 106 comprises a logical node hosting Radio Link Control (RLC), and Media Access Control (MAC) layers as well as the upper or higher portion of the Physical (PHY) layer (where the PHY layer is split between the DU 106 and RU 108). Each RU 108 comprises a logical node hosting the portion of the PHY layer not implemented in the DU 106 (that is, the lower portion of the PHY layer) as well as implementing the basic RF and antenna functions.

Although the CU 104, DU 106, and RUs 108 are described as separate logical entities, one or more of them can be implemented together using shared physical hardware and/or software. For example, in the exemplary embodiment shown in FIG. 1, for each cell 102, the CU 104 and DU 106 serving that cell 102 are physically implemented together using shared hardware and/or software, whereas each RU 108 is physically implemented using separate hardware and/or software.

Also, in the exemplary embodiment described here in connection with FIG. 1, the RAN system 100 is implemented as a Fifth Generation New Radio (5G NR) RAN that supports a 5G NR wireless interface in accordance with the 5G NR specifications and protocols promulgated by the 3rd Generation Partnership Project (3GPP). Thus, in this embodiment, the RAN system 100 can also be referred to as a "Next Generation Node B" 100 or "gNB" 100.

Each RU 108 includes or is coupled to one or more antennas 110 via which downlink RF signals are radiated to various items of user equipment (UE) 112 and via which uplink RF signals transmitted by UEs 112 are received.

The system 100 is coupled to a core network 114 of the associated wireless network operator over an appropriate backhaul 116 (such as the Internet). Also, each DU 106 is communicatively coupled to the RUs 108 served by it using a fronthaul 118. Each of the DU 106 and RUs 108 include one or more network interfaces (not shown) in order to enable the DU 106 and RUs 108 to communicate over the fronthaul 118.

In one implementation, the fronthaul 118 that communicatively couples the DU 106 to the RUs 108 is implemented using a switched ETHERNET network 120. In such an implementation, each DU 106 and RUs 108 includes one or more ETHERNET interfaces for communicating over the switched ETHERNET network 120 used for the fronthaul 118. However, it is to be understood that the fronthaul between each DU 106 and the RUs 108 served by it can be implemented in other ways.

Each CU 104, DU 106, and RU 108 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 104, DU 106, RU 108, and the system 100 more generally, can be implemented in other ways.

Other embodiments can be implemented in other ways.

As noted above, in the exemplary embodiment described here in connection with FIG. 1, the RAN system 100 is implemented as a 5G NR RAN that supports a 5G NR wireless interface to wirelessly communicate with the UEs 112.

More specifically, in the exemplary embodiment described here in connection with FIG. 1, the 5G NR wireless interface supports the use of beamforming for wirelessly communicating with the UEs 112 in both the downlink and uplink directions using the millimeter wave (mmWave) radio frequency (RF) range defined for 5G NR (Frequency Range 2 or "FR2"). 5G NR RAN systems typically make use of beams and beam forming, especially when FR2 is used.

To perform such beamforming, each RU 108 comprises an array of multiple, spatially separated antennas 110. When FR2 is used, the spacing of the antennas 110 in the array is on the order of several millimeters (as opposed to several centimeters as is the case when FR1 (described below) is used) and can be implemented in a convenient fashion.

Each beam concentrates energy in a single narrow direction, thus providing better signal quality for a UE 112 that is within that beam. In the downlink direction (that is, when the gNB 100 transmits to the UE 112), the directionality of the array is controlled by adjusting the phase and relative amplitude of the signal transmitted from each antenna 110 in order to create a pattern of constructive and destructive interference in the wavefront. In the uplink direction (that is, when the gNB 100 receives transmissions from the UE 112), the directionality of the array is likewise controlled by adjusting the phase and relative amplitude of the signal received via each antenna 110 in order to create a pattern of constructive and destructive interference in the resulting combined signal (which results from combining the signals received via all of the antennas 110 in the array). That is, for both downlink and uplink, each "beam" has an associated direction.

Beamforming can be done in an analog manner (for example, by applying the phase and relative amplitude weights in the RF front end circuitry in each RU 108), in a digital manner (for example, by applying the phase and relative amplitude weights to the frequency domain data generated for each antenna 110 for that UE 112 as a part of the lower PHY layer processing performed in each RU 108), or a combination of analog and digital beamforming.

Although the following examples are described as being implemented using FR2, it is to be understood that other frequency ranges can also theoretically be used (for example, the sub 6 Gigahertz (GHz) frequency range defined for 5G NR (Frequency Range 1 or "FR1")).

The gNB 100 is configured to transmit to the various UEs 112 served by it using a predetermined number of beams. Each given predetermined beam has a set of "neighbor" beams that are oriented in the directions that are closest to the direction of that given beam.

In order to determine which beam to use to communicate with a particular UE 112, the gNB 100 is configured to periodically perform a beam-sweeping process that is defined by the relevant 5G NR specification. The particular beam used to communicate with a particular UE 112 is also referred to here as the "serving" beam for that UE 112.

Figure 2:
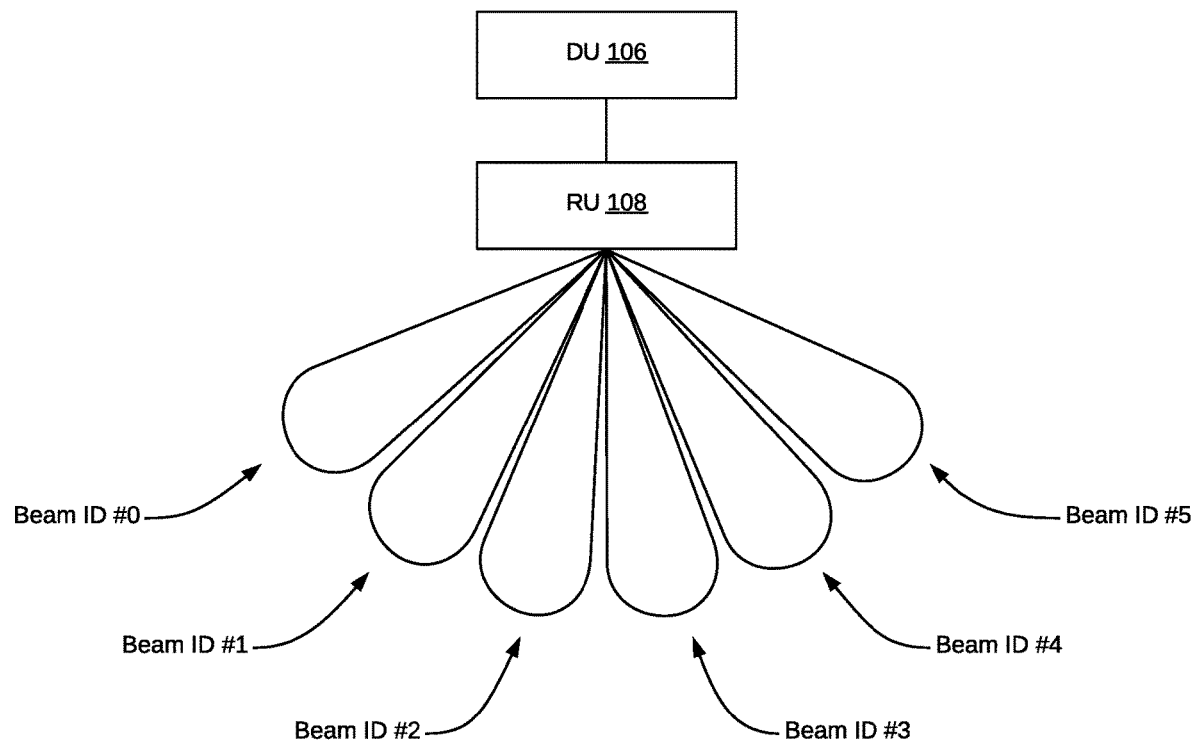
FIG. 2 is a block diagram illustrating one example of a beam-sweeping process.

As shown in FIG. 2, as a part of this beam-sweeping process, the gNB 100 transmits a Synchronization Signal Block (SSB) using all of the predefined beams currently being used by the gNB 100. The SSB transmission made using each beam includes an identifier (also referred to here as "beam identifier" or "beam ID") assigned to that beam. Each UE 112 measures the received signal strength of the SSB transmission made using each beam and reports the measurement for each beam to the gNB 100. The determination as to which beam to use to communicate with a particular UE 112 is also made using measurements of Channel State Information Reference Signal (CSI-RS) transmissions received at the UEs 112 and measurements of Sounding Reference Signal (SRS) transmissions received at the RUs 108. The gNB 100 only transmit data to (in the downlink) and receives data from (in the uplink) the UE 112 using the beam determined for that UE 112. This beam determination is periodically performed in order to determine which beam the gNB 100 should use to communicate with that UE 112 given the UE's 112 current location.

Figure 3:
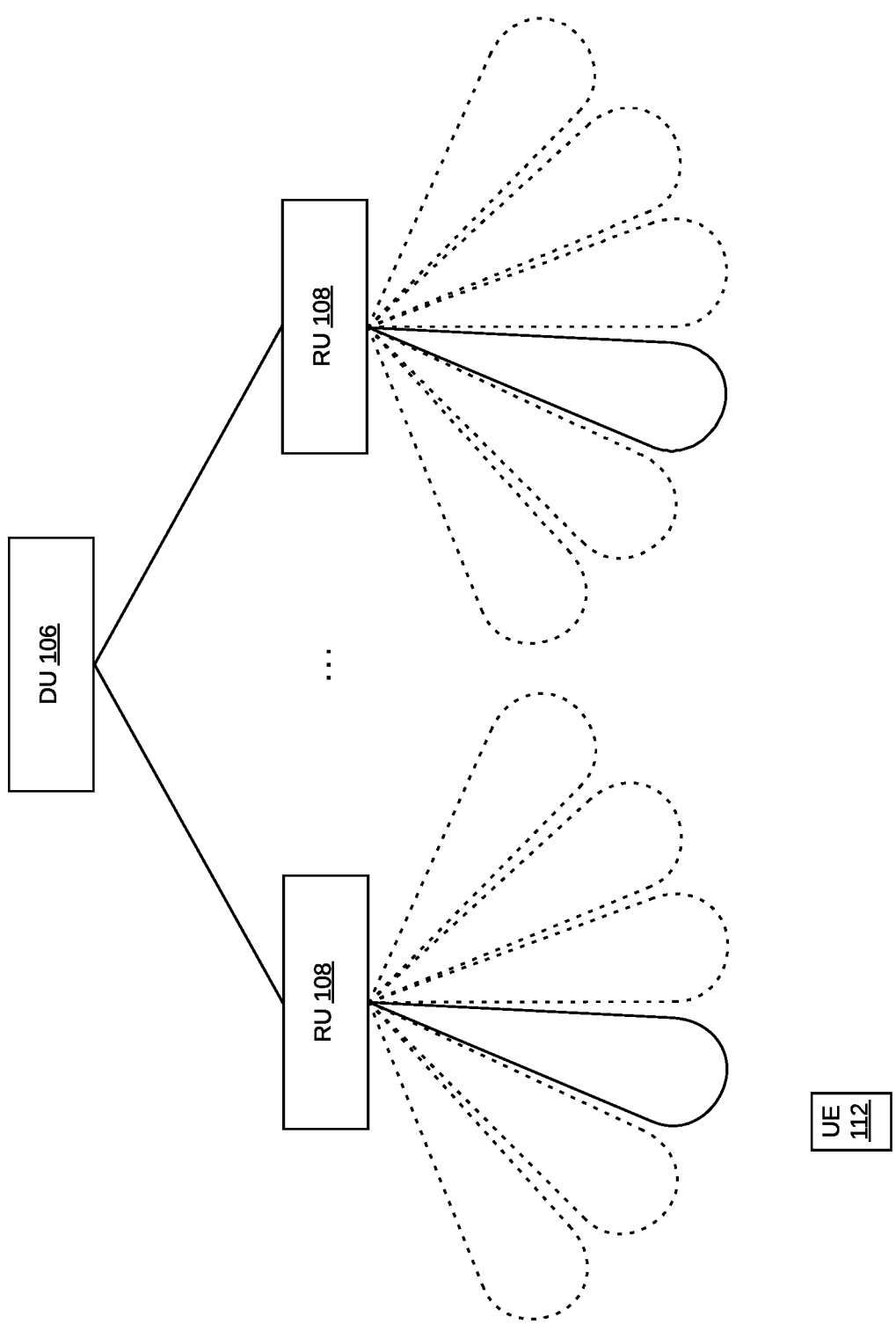
FIG. 3 is a block diagram illustrating another example of a beam-sweeping process.

As noted above, the gNB 100 shown in FIG. 1 includes multiple RUs 108. The gNB 100 is configured to serve each UE 112 using a set of the RUs 108. Each RU 108 is capable of performing beamforming independently of the other RUs 108 (using analog and/or digital beamforming). That is, for each time-frequency resource, each RU 108 can use a different beam. As shown in FIG. 3, the beam-sweeping processing described above is performed simultaneously from all RUs 108 serving a cell 102. That is, during this process, all of the RUs 108 make the same SSB transmissions using the same beams during the same time-frequency resource. Each UE 112 measures the received signal strength of the SSB transmission made using each beam from all the RUs 108 and reports the received signal strength measurement for each beam to the gNB 100. Using this beam-sweeping information, the gNB 100 can determine which beam to use to serve each UE 112 but will not be able to determine which set of RUs 108 to use to serve the UE 112.

Also, the gNB 100 shown in FIG. 1 is configured to support reuse. As noted above, "reuse" refers to situations where the gNB 100 serving a cell 102 simultaneously transmits separate data to, or receives separate data from, multiple UEs 112 using the same time-frequency resource, where each of the multiple UEs is served by a different set of RUs 108.

Typically, when FR2 is used, the set of RUs 108 serving each UE 112 will likely include one RU 108 but, possibly, two RUs 108 (though it is possible that in some environments the set of RUs 108 serving a particular UE 112 will include a greater number of RUs 108).

FIGS. 4, 6, and 8 illustrate three different methods 400, 600, and 800, respectively, of determining the set of RUs 108 that should be used to serve a UE 112 when beamforming is used. The three different methods 400, 600, and 800 are all based on Sounding Reference Signal (SRS) transmissions made by each UE 112. Each of these three different methods 400, 600, and 800 can be performed periodically all of the time for all UEs 112 served by the gNB 100. Alternatively, each of these three different methods 400, 600, and 800 can be performed as needed in response to the occurrence of a specific condition or event. For example, a determination that a UE 112 that is currently being served using a first beam has now reported (as a part of the beam-sweep process described above) a good received signal strength for a different (second) beam that is not one of the neighbor beams of the first beam can be used as an indication that the UE 112 is receiving the second beam from a different RU 108. In response to such a determination, the gNB 100 can cause one of the methods 400, 600, and 800 to be performed. Moreover, a courser (and more resource efficient) method (such as method 600) can be performed periodically and a more precise (but less resource efficient) method (such as method 400) can be performed as needed in response to the occurrence of a specific condition or event (for example, if the results of performing the courser method results do not have a high confidence level (for example, because the set of serving RUs 108 includes too many RUs 108 or no RU 108 receives the SRS transmission with a sufficiently good received signal strength).

FIG. 4 comprises a high-level flowchart illustrating one exemplary embodiment of a method 400 of determining the set of RUs 108 that should be used to serve a UE 112 when beamforming is used as well as the beam each of the set of serving RUs 108 should use to serve the UE 112.

The embodiment of method 400 shown in FIG. 4 is described here as being implemented by a multi-RU gNB 100 of the type described above in connection with FIG. 1. More specifically, the processing of method 400 is described here as being performed by the DU 106 of the gNB 100.

Also, the embodiment of method 400 shown in FIG. 4 is described here as being performed for a particular UE 112, though it is to be understood that method 400 can be performed for each UE 112 served by the gNB 100. Moreover, as used here, the set of "candidate" RUs 108 comprise those RUs 108 that are checked using method 400 to see if those RUs 108 should serve the UE 112.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

Method 400 comprises scheduling the UE 112 to make a set of SRS transmissions (block 402). The gNB 100 can instruct the UE 112 to make the set of SRS transmissions by sending appropriate messages to the UE 112 via the Physical Downlink Control Channel (PDCCH). In this embodiment, the gNB 100 does not instruct the UE 112 as to what type of beamforming to use for the SRS transmissions.

Method 400 further comprises measuring, at every candidate RU 108, the received signal strength of each such SRS transmission received from the UE 112 using a respective different beam (block 404). The set of candidate RUs 108 can include every RU 108 used to serve the cell 102. Alternatively, in order to optimize the performance of method 400, only the RUs 108 in the "neighborhood" of the UE 112 (that is, only the RUs 108 that are physically close to the UE 112) can be included in the set of candidate RUs 108, where the received signal strength of each SRS transmission received from the UE 112 is measured only at those neighboring RUs 108.

Also, the received signal strength of a SRS transmission received from the UE 112 can be measured at every candidate RU 108 using every one of the predetermined beams. Alternatively, in order to optimize the performance of method 400, the received signal strength of a SRS transmission received from the UE 112 can be measured at every candidate RU 108 using only those beams that the UE 112 reported as having significant received signal strength during the most-recent bream-sweep process. This can reduce the amount of SRS transmissions that are needed for each run of method 400.

Moreover, in order to optimize the performance of method 400, if a given SRS transmission comprises multiple symbols, each candidate RU 108 can use a different beam to receive each of the symbols in such a multi-symbol SRS transmission. This can also reduce the amount of SRS transmissions that are needed for each run of method 400.

Method 400 further comprises determining, using the SRS transmission measurements, the set of RUs 108 that should be used to serve the UE 112 and the respective beam to be used at each of those RUs 108s to serve the UE 112 (block 406).

In one implementation, this is done by identifying the RU 108 and beam combination (also referred to here as a "RU-beam tuple") used to measure the highest received signal strength of a SRS transmission from the UE 112 and including that RU 108 in the set of RUs 108 should be used to serve the UE 112 and using that beam to serve the UE 112 from that RU 108. In this implementation, if the next highest measured received signal strength is above a predetermined minimum threshold and differs from the highest measured received signal strength by less than a predetermined maximum amount, the RU 108 at which this next highest measured received signal strength was measured is also included in the set of RUs 108 that should be used to serve the UE 112 and the beam used by that RU 108 to make this measurement is used to serve the UE 112. This last step can be repeated for each successive next measured highest received signal strength until one of the tests noted above fails (though it is likely to be the case that the serving set of RUs 108 will most likely only have one RU 108 and, possibly, two RUs 108 when FR2 is used). Other approaches can also be used.

FIG. 5 illustrates one example of the operation of method 400 shown in FIG. 4. In this example, the gNB 100 schedules the UE 112 to make a set of SRS transmissions (without instructing the UE 112 as to the type of beamforming to use for the SRS transmissions). Every candidate RU 108 measures the received signal strength of each such SRS transmission received from the UE 112 using a respective different beam. In this example, the highest measured received signal strength of a SRS transmission received from the UE 112 is measured by the RU 108 having RU ID #0 using the beam having the beam ID #2 and the received signal strengths of a SRS transmission received from the UE 112 measured using the other RU-beam combinations do not exceed predetermined minimum threshold value. As a result, the serving set of RUs 108 for the UE 112 includes only the RU 108 having RU ID #0 and that RU 108 uses the beam having the beam ID #2 to serve the UE 112.

By using method 400 shown in FIG. 4, it is possible to determine both the set of serving RUs 108 for a UE 112, but also the respective beam to be used by each of the serving RUs 108 to serve that UE 112. However, this comes with the tradeoff that several SRS transmissions are likely required to enable multiple measurements to be made at each RU 108 (each one using a different beam). FIG. 6 illustrates another approach that is more resource efficient but that comes with the tradeoff that this approach is only able to determine the set of serving RUs 108 for the UE 112.

FIG. 6 comprises a high-level flowchart illustrating one exemplary embodiment of a method 600 of determining the set of RUs 108 that should be used to serve a UE 112 when beamforming is used as well as determining the beam each of the set of serving RUs 108 should use to serve the UE 112.

The embodiment of method 600 shown in FIG. 6 is described here as being implemented by a multi-RU gNB 100 of the type described above in connection with FIG. 1. More specifically, the processing of method 600 is described here as being performed by the DU 106 of the gNB 100.

Also, the embodiment of method 600 shown in FIG. 6 is described here as being performed for a particular UE 112, though it is to be understood that method 600 can be performed for each UE 112 served by the gNB 100. Moreover, as used here, the set of "candidate" RUs 108 comprise those RUs 108 that are checked using method 600 to see if those RUs 108 should serve the UE 112.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

Method 600 comprises scheduling the UE 112 to make an SRS transmission (block 602). The gNB 100 can instruct the UE 112 to make the SRS transmission by sending appropriate messages to the UE 112 via the PDCCH. In this embodiment, the gNB 100 does not instruct the UE 112 as to what type of beamforming to use for the SRS transmission.

Method 600 further comprises measuring, at every candidate RU 108, the received signal strength of the SRS transmission received from the UE 112 using an omni-directional or wide beam (block 604). As with method 400, the set of candidate RUs 108 used with method 600 can include every RU 108 used to serve the cell 102. Alternatively, in order to optimize the performance of method 600, only the RUs 108 in the "neighborhood" of the UE 112 (that is, only the RUs 108 that are physically close to the UE 112) can be included in the set of candidate RUs 108, where the received signal strength of the SRS transmission received from the UE 112 is measured only at those neighboring RUs 108.

Method 600 further comprises determining, using the SRS transmission measurements, the set of RUs 108 that should be used to serve the UE 112 (block 606). This can be done in the same general manner described above in connection with block 406 of FIG. 4.

Method 600 further comprises determining the beam to serve the UE 112 using the serving set of RUs 108 based on the measurements reported by the UE 112 during the most-recent beam-sweeping process (block 608). In one implementation, every RU 108 included in the set of serving RUs 108 is configured to use the beam for which the UE 112 reported the highest received signal strength during the most-recent beam-sweeping process.

FIG. 7 illustrates one example of the operation of method 600 shown in FIG. 6. In this example, the gNB 100 schedules the UE 112 to make an SRS transmission (without instructing the UE 112 as to the type of beamforming to use for the SRS transmission). Every candidate RU 108 measures the received signal strength of the SRS transmission received from the UE 112 using an omni-directional or wide beam. In this example, the highest received signal strength of the SRS transmission received from the UE 112 is measured by the RU 108 having RU ID #0 and the received signal strengths of the SRS transmission received from the UE 112 measured using the other RUs 108 do not exceed predetermined minimum threshold value. As a result, the serving set of RUs 108 for the UE 112 includes only the RU 108 having RU ID #0. In this example, the beam for which the UE 112 reported the highest received signal strength during the most-recent beam-sweeping process is the beam having the beam ID #2 (not shown in FIG. 7). As a result, the serving set of RUs 108 (the RU 108 having the RU ID #0 in this example) use the beam having the beam ID #2 to serve the UE 112.

With 5G NR, a UE 112 can also be configured to transmit using beam forming. FIG. 8 illustrates another approach that uses this feature of 5G NR.

FIG. 8 comprises a high-level flowchart illustrating one exemplary embodiment of a method 600 of determining the set of RUs 108 that should be used to serve a UE 112 when beamforming is used.

The embodiment of method 800 shown in FIG. 8 is described here as being implemented by a multi-RU gNB 100 of the type described above in connection with FIG. 1. More specifically, the processing of method 800 is described here as being performed by the DU 106 of the gNB 100.

Also, the embodiment of method 800 shown in FIG. 8 is described here as being performed for a particular UE 112, though it is to be understood that method 800 can be performed for each UE 112 served by the gNB 100. Moreover, as used here, the set of "candidate" RUs 108 comprise those RUs 108 that are checked using method 800 to see if those RUs 108 should serve the UE 112.

The blocks of the flow diagram shown in FIG. 8 have been arranged in a generally sequential manner for ease of explanation; however, it is to be understood that this arrangement is merely exemplary, and it should be recognized that the processing associated with method 800 (and the blocks shown in FIG. 8) can occur in a different order (for example, where at least some of the processing associated with the blocks is performed in parallel and/or in an event-driven manner). Also, most standard exception handling is not described for ease of explanation; however, it is to be understood that method 800 can and typically would include such exception handling.

Method 800 comprises scheduling the UE 112 to make an SRS transmission using a directional transmission in the same direction as the beam for which the UE 112 reported the highest received signal strength during the most-recent beam-sweeping process (block 802). The gNB 100 can instruct the UE 112 to make this directional SRS transmission by sending appropriate messages to the UE 112 via the PDCCH.

Method 800 further comprises measuring, at every candidate RU 108, the received signal strength of the SRS transmission received from the UE 112 using an omni-directional or wide-beam (block 804). As with method 400, the set of candidate RUs 108 used with method 600 can include every RU 108 used to serve the cell 102. Alternatively, in order to optimize the performance of method 800, only the RUs 108 in the "neighborhood" of the UE 112 (that is, only the RUs 108 that are physically close to the UE 112) can be included in the set of candidate RUs 108, where the received signal strength of the SRS transmission received from the UE 112 is measured only at those neighboring RUs 108.

Method 800 further comprises determining, using the SRS transmission measurements, the set of RUs 108 that should be used to serve the UE 112 (block 806). This can be done in the same general manner described above in connection with block 406 of FIG. 4.

Method 800 further comprises determining the beam to serve the UE 112 using the serving set of RUs 108 based on the measurements reported by the UE 112 during the most-recent beam-sweeping process (block 808). In one implementation, every RU 108 included in the set of serving RUs 108 is configured to use the beam for which the UE 112 reported the highest received signal strength during the most-recent beam-sweeping process.

FIG. 9 illustrates one example of the operation of method 800 shown in FIG. 8. In this example, the gNB 100 schedules the UE 112 to make an SRS transmission using a directional transmission in the same direction as the beam for which the UE 112 reported the highest received signal strength during the most-recent beam-sweeping process. Every candidate RU 108 measures the received signal strength of the directional SRS transmission received from the UE 112 using an omni-directional or wide beam. In this example, the highest received signal strength of the directional SRS transmission received from the UE 112 is measured by the RU 108 having RU ID #0 and the received signal strengths of the directional SRS transmission received from the UE 112 measured using the other RUs 108 do not exceed predetermined minimum threshold value. As a result, the serving set of RUs 108 for the UE 112 includes only the RU 108 having RU ID #0. In this example, the beam for which the UE 112 reported the highest received signal strength during the most-recent beam-sweeping process is the beam having the beam ID #2 (not shown in FIG. 9). As a result, the serving set of RUs 108 (the RU 108 having the RU ID #0 in this example) use the beam having the beam ID #1 to serve the UE 112.

Methods 400, 600, and 800 described above in connection with FIGS. 4, 6 and 8, respectively, make use of SRS transmissions from each UE 112 in order to determine the set of serving RUs 108. The set of serving RUs 108 can also be determined using other types of reference signal transmissions. For example, with 5G NR, different RUs 108 can be configured to transmit different Channel State Information Reference Signals (CSI-RSs) during different time-frequency resources. The set of serving RUs 108 can be determined using such CSI-RSs. FIG. 10 illustrates one approach to doing this.

FIG. 10 comprises a high-level flowchart illustrating one exemplary embodiment of a method 1000 of determining the set of RUs 108 that should be used to serve a UE 112 when beamforming is used as well as the beam each of the set of serving RUs 108 should use to serve the UE 112.

The embodiment of method 1000 shown in FIG. 10 is described here as being implemented by a multi-RU gNB 100 of the type described above in connection with FIG. 1. More specifically, the processing of method 1000 is described here as being performed by the DU 106 of the gNB 100.

Also, the embodiment of method 1000 shown in FIG. 10 is described here as being performed for a particular UE 112, though it is to be understood that method 1000 can be performed for each UE 112 served by the gNB 100. Moreover, as used here, the set of "candidate" RUs 108 comprise those RUs 108 that are checked using method 1000 to see if those RUs 108 should serve the UE 112.

The blocks of the flow diagram shown in FIG. 10 have been arranged in a generally sequential manner for ease of explanation; however, it is to be understood that this arrangement is merely exemplary, and it should be recognized that the processing associated with method 1000 (and the blocks shown in FIG. 10) can occur in a different order (for example, where at least some of the processing associated with the blocks is performed in parallel and/or in an event-driven manner). Also, most standard exception handling is not described for ease of explanation; however, it is to be understood that method 1000 can and typically would include such exception handling.

Method 1000 comprises scheduling each of the set of candidate RUs 108 to make CSI-RS transmissions using various beams during time-frequency resources in which only that RU 108 makes the CSI-RS transmissions (block 1002) and instructing the UE 112 to separately report the signal strength measurements of the various CSI-RS transmissions from the various candidate RUs 108 (block 1004). As a result of doing this, when the UE 112 makes a measurement report for each such CSI-RS transmission from a particular RU 108 (and only that RU 108), the DU 106 is able to associate the measurement report with that RU 108. This approach can be contrasted with the beam-sweep process in which all of the RUs 108 simultaneously transmit the same reference signal during the same time-frequency resources and, as a result, the measurement reports provided by the UE 112 for such reference signals cannot be associated with any particular RU 108.

The set of candidate RUs 108 can include every RU 108 used to serve the cell 102. Alternatively, in order to optimize the performance of method 1000, only the RUs 108 in the neighborhood of the UE 112 can be included in the set of candidate RUs 108, where the CSI-RS transmissions to the UE 112 are only made from those neighboring RUs 108.

Method 1000 further comprises receiving, at the gNB 100, separate measurement reports from the UE 112 for the various CSI-RS transmissions (block 1006) and determining, using the measurements reports, the set of RUs 108 that should be used to serve the UE 112 and the respective beam to be used at each of the serving RUs 108s to serve the UE 112 (block 1008).

In one implementation, this determination is made by identifying the RU 108 and beam combination used to transmit the CSI-RS transmission for which the UE 112 measured the highest received signal strength and including that RU 108 in the set of serving RUs 108 for the UE 112 and using that beam to serve the UE 112 from that RU 108. In this implementation, if the next highest measured received signal strength reported by the UE 112 is above a predetermined minimum threshold and differs from the highest measured received signal strength by less than a predetermined maximum amount, the RU 108 used to transmit the CSI-RS transmission for which the UE 112 measured the next highest received signal strength is also included in the set of serving RUs 108 for the UE 112 and the beam used to transmit that CSI-RS transmission from that RU 108 is used to serve the UE 112. This last step can be repeated for each successive next measured highest received signal strength until one of the tests noted above fails (though it is likely to be the case that the serving set of RUs 108 will most likely only have one RU 108 and, possibly, two RUs 108 when FR2 is used). Other approaches can also be used.

FIG. 11 illustrates one example of the operation of method 1000 shown in FIG. 10. In this example, the gNB 100 schedules each of the set of candidate RUs 108 to make CSI-RS transmissions to the UE 112 using various beams during time-frequency resources in which only that RU 108 makes the CSI-RS transmissions. The UE 112 separately measures the received signal strength of the different CSI-RS transmissions and separately reports those measurements to the gNB 100. In this example, the RU 108 and beam combination used to transmit the CSI-RS transmission for which the UE 112 measured the highest received signal strength is the RU 108 having RU ID #0 and the beam having the beam ID #1. In this example, the received signal strengths measured by the UE 112 for the other CSI-RS transmissions do not exceed predetermined minimum threshold value. As a result, the serving set of RUs 108 for the UE 112 includes only the RU 108 having RU ID #0, which uses the beam having the beam ID #2 to serve the UE 112.

The set of RUs 108 (and the corresponding beam used by each such RU 108) used to serve each UE 112 are then used in employing reuse in the multi-RU gNB 100. FIG. 12 illustrates one approach to doing this.

FIG. 12 comprises a high-level flowchart illustrating one exemplary embodiment of a method 1200 of employing reuse in a multi-RU gNB 100.

The embodiment of method 1200 shown in FIG. 12 is described here as being implemented by a multi-RU gNB 100 of the type described above in connection with FIG. 1. More specifically, the processing of method 1200 is described here as being performed by the DU 106 of the gNB 100.

Also, method 1200 is described as being performed for a particular set of UEs 112 that are being considered for being scheduled to use the same time-frequency resources, though it is to be understood that method 800 can be performed for various possible sets of UEs 112 served by the gNB 100.

The blocks of the flow diagram shown in FIG. 12 have been arranged in a generally sequential manner for ease of explanation; however, it is to be understood that this arrangement is merely exemplary, and it should be recognized that the processing associated with method 1200 (and the blocks shown in FIG. 12) can occur in a different order (for example, where at least some of the processing associated with the blocks is performed in parallel and/or in an event-driven manner). Also, most standard exception handling is not described for ease of explanation; however, it is to be understood that method 1200 can and typically would include such exception handling.

Method 1200 comprises determining if any UE 112 included in the set of UEs 112 has a RU-beam tuple assigned to it that is also assigned to one or more other UEs 112 included in the set of UEs 112 (block 1202). If that is the case, the UEs 112 included in the set of UEs 112 having the same RU-beam tuple assigned to them cannot be scheduled to use the same time-frequency resources (block 1204).

Method 1200 further comprises, if it is determined that none of the set of UEs 112 have the same RU-beam tuple assigned to them, determining if the beam assigned to any of the set of UEs 112 intersects the beam assigned to any of the other UEs 112 included in that set (block 1206). If that is the case, the UEs 112 included in the set of UEs 112 having intersecting beams assigned to them cannot be scheduled to use the same time-frequency resources (block 1208).

Method 1200 further comprises, if it is determined that none of the set of UEs 112 have intersecting beams assigned to them, determining if any UE 112 included in the set of UEs 112 has a RU 108 assigned to it that is also assigned to one or more other UEs 112 included in the set of UEs 112 (block 1210) and, if that is case, determining if that RU 108 is capable of simultaneously transmitting to all of the UEs 112 having that RU 108 assigned to them (block 1212). If it is determined that none of the UEs 112 included in the set of UEs 112 have the same RU 108 assigned to them, the set of UEs 112 can be scheduled to use the same time-frequency resources (block 1214). Also, if a UE 112 included in the set of UEs 112 has a RU 108 assigned to it that is also assigned to one or more other UEs 112 included in the set of UEs 112 and that RU 108 is capable of simultaneously transmitting to all of the UEs 112 having that RU 108 assigned to them, the set of UEs 112 can be scheduled to use the same time-frequency resources (block 1214). Otherwise, the UEs 112 having the same RUs 108 assigned to them cannot be scheduled to use the same time-frequency resources (block 1216).

FIGS. 13A-13B illustrate examples of the operation of method 1200 shown in FIG. 12.

In the example shown in FIG. 13A, the set of UEs 112 being considered for being scheduled to use the same time-frequency resources includes three UEs 112—UE A, UE B, and UE C. In this example, the RU 108 having RU ID #0 and the beam having the beam ID #0 are used to serve UE A (that is, the RU-beam tuple assigned to UE A comprises [RU ID #0, beam ID #0]), the RU 108 having RU ID #0 and the beam having the beam ID #4 are used to serve UE B (that is, the RU-beam tuple assigned to UE B comprises [RU ID #0, beam ID #4]), and the RU 108 having RU ID #1 and the beam having the beam ID #5 are used to serve UE C (that is, the RU-beam tuple assigned to UE C comprises [RU ID #1, beam ID #5]).

In the example shown in FIG. 13A, none of the UEs A, B, C have the same RU-beam tuple assigned to them, nor do any of them have intersecting beams assigned to them. Also, even though UE A and UE B have the same RU 108 assigned to them (RU #0), that RU 108 (RU #0) is capable of simultaneously transmitting to two UEs 112. Therefore, that set of UEs 112 (UE A, UE B, and UE C) can be scheduled to use the same time-frequency resources.

In the example shown in FIG. 13B, the set of UEs 112 being considered for being scheduled to use the same time-frequency resources includes two UEs 112—UE B and UE D. In this example, the RU 108 having RU ID #0 and the beam having the beam ID #4 are used to serve UE B (that is, the RU-beam tuple assigned to UE B comprises [RU ID #0, beam ID #4]) and the RU 108 having RU ID #1 and the beam having the beam ID #1 are used to serve UE C (that is, the RU-beam tuple assigned to UE C comprises [RU ID #1, beam ID #1]).

In the example shown in FIG. 13B, none of the UEs B and D have the same RU-beam tuple assigned to them. However, in this example, the beams assigned to UEs B and D intersect. Therefore, that set of UEs 112 (UE B and UE D) cannot be scheduled to use the same time-frequency resources.

Other embodiments can be implemented in other ways. For example, in one embodiment, the system 100 can be configured to use all of the RUs 108 to serve the same cell 102. The system 100 can be configured to wirelessly transmit at least some user data to a first user device 112 using a first subset of the RUs 108 and a first beam, where the first subset of the RUs 108 includes less than all of the RUs 108 otherwise used to serve the same cell 102. In such an embodiment, the system 100 can be configured to determine which RUs 108 are included in the first subset of RUs 108 used to transmit said at least some user data to the first user device 112 based on measurement reports made by the first user device 112 of reference signal transmissions transmitted using multiple beams, where at least some of the reference signal transmissions are transmitted from less than all of the RUs 108. In such an embodiment, the DU 106 is coupled to the plurality of RUs 108 via at least one intermediary node. The intermediary node can comprise an Ethernet switch used in the switched ethernet network 120.

The reference signal transmissions can comprise CSI-RS transmissions. The first subset of RUs 108 used to wirelessly transmit to the first user device 112 can change (for example, due to movement of the first user device 112).

In such an embodiment, the system 100 can further be configured to wirelessly transmit at least some user data to a second user device 112 using a second subset of the RUs 108 and a second beam, the second subset of the RUs 108 including less than all of the RUs 108 otherwise used to serve the same cell 102. The system 100 can be further configured to determine which RUs 108 are included in the second subset of RUs 108 used to transmit at least some user data to the second user device 112 based on measurement reports made by the second user device 112 of the reference signal transmissions transmitted using the multiple beams. The first subset of RUs 108 can differ from the second subset of RUs 108. Also, the first beam can differ from the second beam. The second subset of RUs 108 used to wirelessly transmit to the second user device 112 can change (for example, due to movement of the second user device 112).

Likewise, in another embodiment, the system 100 can be configured to use all of the RUs 108 to serve the same cell 102 and to wirelessly receive at least some user data from a first user device 112 using a first subset of the RUs 108 and a first beam, where the first subset of the RUs 108 including less than all of the RUs 108 otherwise used to serve the same cell 102. In such an embodiment, the system 100 can be configured to determine which RUs 108 are included in the first subset of RUs 108 used to receive said at least some user data from the first user device 112 based on measurement reports made by the first user device 112 of reference signal transmissions transmitted using multiple beams, where at least some of the reference signal transmissions are transmitted from less than all of the RUs 108. In such an embodiment, the DU 106 is coupled to the plurality of RUs 108 via at least one intermediary node. The intermediary node can comprise an Ethernet switch used in the switched ethernet network 120.

The reference signal transmissions can comprise CSI-RS transmissions. The first subset of RUs 108 used to wirelessly receive from the first user device 112 can change (for example, due to movement of the first user device 112).

In such an embodiment, the system 100 can further be configured to wirelessly receive at least some user data from a second user device 112 using a second subset of the RUs 108 and a second beam, the second subset of the RUs 108 including less than all of the RUs 108 otherwise used to serve the same cell 102. The system 100 can be further configured to determine which RUs 108 are included in the second subset of RUs 108 used to receive at least some user data from the second user device 112 based on measurement reports made by the second user device 112 of the reference signal transmissions transmitted using the multiple beams. The first subset of RUs 108 can differ from the second subset of RUs 108. Also, the first beam can differ from the second beam. The second subset of RUs 108 used to wirelessly receive from the second user device 112 can change (for example, due to movement of the second user device 112).

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system for providing wireless service to user devices using a same cell, the system comprising: a distributed unit (DU) to communicatively couple the system to a core network, the DU configured to implement at least some LAYER 2 functions for a wireless interface and at least some LAYER 1 functions for the wireless interface; and a plurality of remote units (RUs), each of the RUs associated with a respective set of one or more antennas; wherein the system is configured to use all of the RUs to serve the same cell; wherein the system is configured to wirelessly transmit at least some user data to a first user device using a first subset of the RUs and a first beam, the first subset of the RUs including less than all of the RUs otherwise used to serve the same cell; and wherein the system is configured to determine which RUs are included in the first subset of RUs used to transmit said at least some user data to the first user device based on measurement reports made by the first user device of reference signal transmissions transmitted using multiple beams, at least some of the reference signal transmissions transmitted from less than all of the RUs.

Example 2 includes the system of Example 1, wherein the DU is coupled to the plurality of RUs via at least one intermediary node.

Example 3 includes the system of the Example 2, wherein the intermediary node comprises an Ethernet switch.

Example 4 includes the system of any of Examples 1-3, wherein the reference signal transmissions comprise Channel Status Information Reference Signal (CSI-RS) transmissions.

Example 5 includes the system of any of Examples 1-4, wherein the first subset of RUs used to wirelessly transmit to the first user device changes.

Example 6 includes the system of any of Examples 1-5, wherein the system is further configured to wirelessly transmit at least some user data to a second user device using a second subset of the RUs and a second beam, the second subset of the RUs including less than all of the RUs otherwise used to serve the same cell; and wherein the system is further configured to determine which RUs are included in the second subset of RUs used to transmit said at least some user data to the second user device based on measurement reports made by the second user device of the reference signal transmissions transmitted using the multiple beams.

Example 7 includes the system of Example 6, wherein the first subset of RUs differs from the second subset of RUs.

Example 8 includes the system of any of Examples 6-7, wherein the first beam differs from the second beam.

Example 9 includes the system of any of Examples 6-8, wherein the second subset of RUs used to wirelessly transmit to the second user device changes.

Example 10 includes the system of any of Examples 1-9, wherein each of the RUs is located remotely from the DU and at least one other RU.

Example 11 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of user devices using the wireless interface and using beamforming, each of the RUs associated with a respective set of one or more antennas, wherein each RU is configured to implement the LAYER 1 functions for the wireless interface that are not implemented in the DU, wherein the DU and RUs are communicatively coupled to each other over a fronthaul, wherein the system is configured to use all of the RUs to serve the same cell, the method comprising: transmitting reference signals using multiple beams, at least some of the reference signals transmitted from less than all of the RUs; receiving measurement reports made by a first user device of the reference signals; determining which RUs are included in a first subset of RUs, the first subset of the RUs including less than all of the RUs otherwise used to serve the same cell; and wirelessly transmitting at least some user data to the first user device using the first subset of the RUs and a first beam.

Example 12 includes the method of Example 11, wherein the DU is coupled to the plurality of RUs via at least one intermediary node.

Example 13 includes the method of Example 12, wherein the intermediary node comprises an Ethernet switch.

Example 14 includes the method of any of Examples 11-13, wherein the reference signals comprise Channel Status Information Reference Signal (CSI-RS) transmissions.

Example 15 includes the method of any of Examples 11-14, wherein the first subset of RUs used to wirelessly transmit to the first user device changes.

Example 16 includes the method of any of Examples 11-15, wherein the method further comprising: receiving measurement reports made by a second user device of the reference signals; determining which RUs are included in a second subset of RUs, the second subset of the RUs including less than all of the RUs otherwise used to serve the same cell; and wirelessly transmitting at least some user data to the second user device using the second subset of the RUs and a second beam.

Example 17 includes the method of Example 16, wherein the first subset of RUs differs from the second subset of RUs.

Example 18 includes the method of any of Examples 16-17, wherein the first beam differs from the second beam.

Example 19 includes the method of any of Examples 16-18, wherein the second subset of RUs used to wirelessly transmit to the second user device changes.

Example 20 includes a system for providing wireless service to user devices using a same cell, the system comprising: a distributed unit (DU) to communicatively couple the system to a core network, the DU configured to implement at least some LAYER 2 functions for a wireless interface and at least some LAYER 1 functions for the wireless interface; and a plurality of remote units (RUs), each of the RUs associated with a respective set of one or more antennas; wherein the system is configured to use all of the RUs to serve the same cell; wherein the system is configured to wirelessly receiving at least some user data from a first user device using a first subset of the RUs and a first beam, the first subset of the RUs including less than all of the RUs otherwise used to serve the same cell; and wherein the system is configured to determine which RUs are included in the first subset of RUs used to receive said at least some user data from the first user device based on measurement reports made by the first user device of reference signal transmissions transmitted using multiple beams, at least some of the reference signal transmissions transmitted from less than all of the RUs.

Example 21 includes the system of Example 20, wherein the DU is coupled to the plurality of RUs via at least one intermediary node.

Example 22 includes the system of Example 21, wherein the intermediary node comprises an Ethernet switch.

Example 23 includes the system of any of Examples 20-22, wherein the reference signal transmissions comprise Channel Status Information Reference Signal (CSI-RS) transmissions.

Example 24 includes the system of any of Examples 20-23, wherein the first subset of RUs used to wirelessly receive from the first user device changes.

Example 25 includes the system of any of Examples 20-24, wherein the system is further configured to wirelessly receive at least some user data from a second user device using a second subset of the RUs and a second beam, the second subset of the RUs including less than all of the RUs otherwise used to serve the same cell; and wherein the system is further configured to determine which RUs are included in the second subset of RUs used to receive said at least some user data from the second user device based on measurement reports made by the second user device of the reference signal transmissions transmitted using the multiple beams.

Example 26 includes the system of Example 25, wherein the first subset of RUs differs from the second subset of RUs.

Example 27 includes the system of any of Examples 25-26, wherein the first beam differs from the second beam.

Example 28 includes the system of any of Examples 25-27, wherein the second subset of RUs used to wirelessly receive from the second user device changes.

Example 29 includes the system of any of Examples 20-28, wherein each of the RUs is located remotely from the DU and at least one other RU.

Example 30 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of user devices using the wireless interface and using beamforming, each of the RUs associated with a respective set of one or more antennas, wherein each RU is configured to implement the LAYER 1 functions for the wireless interface that are not implemented in the DU, wherein the DU and RUs are communicatively coupled to each other over a fronthaul, wherein the system is configured to use all of the RUs to serve the same cell, the method comprising: transmitting reference signals using multiple beams, at least some of the reference signals transmitted from less than all of the RUs; receiving measurement reports made by a first user device of the reference signals; determining which RUs are included in a first subset of RUs, the first subset of the RUs including less than all of the RUs otherwise used to serve the same cell; and wirelessly receiving at least some user data from the first user device using the first subset of the RUs and a first beam.

Example 31 includes the method of Example 30, wherein the DU is coupled to the plurality of RUs via at least one intermediary node.

Example 32 includes the method of Example 31, wherein the intermediary node comprises an Ethernet switch.

Example 33 includes the method of any of Examples 30-32, wherein the reference signals comprise Channel Status Information Reference Signal (CSI-RS) transmissions.

Example 34 includes the method of any of Examples 30-33, wherein the first subset of RUs used to wirelessly receive from the first user device changes.

Example 35 includes the method of any of Examples 30-34, wherein the method further comprises: receiving measurement reports made by a second user device of the reference signals; determining which RUs are included in a second subset of RUs, the second subset of the RUs including less than all of the RUs otherwise used to serve the same cell; and wirelessly receiving at least some user data from the second user device using the second subset of the RUs and a second beam.

Example 36 includes the method of Example 35, wherein the first subset of RUs differs from the second subset of RUs.

Example 37 includes the method of any of Examples 35-36, wherein the first beam differs from the second beam.

Example 38 includes the method of any of Examples 35-37, wherein the second subset of RUs used to wirelessly receive from the second user device changes.

Example 39 includes a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas; wherein each RU is configured to implement the LAYER 1 functions for the wireless interface that are not implemented in the DU; wherein the DU and RUs are communicatively coupled to each other over a fronthaul; wherein the DU is configured to determine a serving set of RUs that should be used to serve each of the UEs when beamforming is used; wherein the system is configured to simultaneously communicate with multiple UEs using the same time-frequency resources; and wherein the system is configured to determine if a reuse set of UEs can be scheduled to use the same time-frequency resources based on the respective serving set of RUs used to serve each UE included in said reuse set of UEs and the respective beam used to serve each UE included in said reuse set of UEs.

Example 40 includes the system of Example 39, wherein the system is configured to use at least one of: analog beamforming and digital beamforming.

Example 41 includes the system of any of Examples 39-40, wherein the system is configured to wireless communicate with the plurality of UEs using a Fifth Generation New Radio (5G NR) wireless interface.

Example 42 includes the system of any of Examples 39-41, wherein the system is configured to: schedule a UE to make a set of reference signal transmissions; measure, at each of a candidate set of two or more of the RUs, a respective received signal strength of each of the reference signal transmissions from said UE received using a respective at least one of a set of multiple beams; and determine, using the received signal strength measurements, the respective serving set of one or more of the RUs and the respective beam to serve said UE.

Example 43 includes the system of Example 42, wherein the set of reference transmissions comprises a set of Sounding Reference Signal (SRS) transmissions.

Example 44 includes the system of any of Examples 42-43, wherein the candidate set of two or more of the RUs includes one of: all of the RUs; and only the RUs in a neighborhood of said UE.

Example 45 includes the system of any of Examples 42-44, wherein the set of multiple beams includes one of: all of a set of predetermined beams the system is configured to use; and only those beams that said UE reported as having significant received signal strength during a most-recent bream-sweep process performed for said UE.

Example 46 includes the system of any of Examples 39-45, wherein the system is configured to: schedule a UE to make a reference signal transmission; measure, at each of a candidate set of two or more of the RUs, a respective received signal strength of the reference signal transmission from said UE received using an omni-directional or wide beam; and determine, using the received signal strength measurements, the respective serving set of one or more of the RUs to serve said UE.

Example 47 includes the system of Example 46, wherein the set of reference transmissions comprises a set of Sounding Reference Signal (SRS) transmissions.

Example 48 includes the system of any of Examples 46-47, wherein the candidate set of two or more of the RUs includes one of: all of the RUs; and only the RUs in a neighborhood of said UE.

Example 49 includes the system of any of Examples 46-48, wherein each of the serving set of one or more of the RUs used to serve said UE uses, to serve said UE, the beam determined by a most-recent bream-sweep process performed for said UE.

Example 50 includes the system of any of Examples 39-49, wherein the system is configured to: schedule a UE to make a reference signal transmission using a directional transmission in a same direction as a beam for which said UE reported a highest received signal strength during a most-recent beam-sweeping process; measure, at each of a candidate set of two or more of the RUs, a respective received signal strength of the reference signal transmission from said UE received using an omni-directional or wide beam; and determine, using the received signal strength measurements, the serving set of one or more of the RUs to serve said UE.

Example 51 includes the system of Example 50, wherein the set of reference transmissions comprises a set of Sounding Reference Signal (SRS) transmissions.

Example 52 includes the system of any of Examples 50-51, wherein the candidate set of two or more of the RUs includes one of: all of the RUs; and only the RUs in a neighborhood of said UE.

Example 53 includes the system of any of Examples 50-52, wherein each of the serving set of one or more of the RUs used to serve said UE uses, to serve said UE, the beam for which said UE reported the highest received signal strength during the most-recent beam-sweeping process.

Example 54 includes the system of any of Examples 39-53, wherein the system is configured to: schedule each of a candidate set of two or more of the RUs to make reference signal transmissions using a set of multiple beams during time-frequency resources in which only that RU makes the reference signal transmissions; instruct a UE to separately report signal strength measurements of the reference signal transmissions from the RUs in the candidate set; receive, at the system, the separate measurement reports from said UE made by said UE for the reference signal transmissions; and determine, using the measurements reports, the respective serving set of one or more of the RUs and the respective beam to serve said UE.

Example 55 includes the system of Example 54, wherein the set of reference transmissions comprises Channel Status Information Reference Signal (CSI-RS) transmissions.

Example 56 includes the system of any of Examples 54-55, wherein the candidate set of two or more of the RUs includes one of: all of the RUs; and only the RUs in a neighborhood of said UE.

Example 57 includes the system of any of Examples 54-56, wherein the set of multiple beams includes one of: all of a set of predetermined beams the system is configured to use; and only those beams that said UE reported as having significant received signal strength during a most-recent bream-sweep process performed for said UE.

Example 58 includes the system of claim 39, wherein each of said set of UEs has a respective RU-beam tuple assigned to that UE that comprises the respective set of RUs used to serve that UE and the respective beam used to serve that UE; and wherein the system is configured to determine if said set of UEs can be scheduled to use the same time-frequency resources based on the respective set of RUs used to serve each UE included in said set of UEs and the respective beam used to serve each UE included in said set of UEs by doing the following: determining if any UE included in said set of UEs has a RU-beam tuple assigned to that UE that is also assigned to one or more other UEs included in said set of UEs, wherein any UEs included in said set of UEs having the same RU-beam tuple assigned to those UEs cannot be scheduled to use the same time-frequency resources; if none of said set of UEs have the same RU-beam tuple assigned thereto, determining if the respective beam assigned to any of said set of UEs intersects the beam assigned to any of the other UEs included in said set of UEs, wherein any UEs included in said set of UEs having intersecting beams assigned thereto cannot be scheduled to use the same time-frequency resources; if none of said set of UEs have intersecting beams assigned thereto: determining if any UE included in said set of UEs has a RU assigned thereto that is also assigned to one or more other UEs included in said set of UEs; and if any UE included in said set of UEs has a RU assigned thereto that is also assigned to one or more other UEs included in said set of UEs, determining if that RU is capable of simultaneously transmitting to all of the UEs included in said set of UEs having that UE assigned thereto; wherein if it is determined that none of the UEs included in said set of UEs have the same RU assigned thereto, said set of UEs can be scheduled to use the same time-frequency resources; wherein if a UE included in said set of UEs has a RU assigned thereto that is also assigned to one or more other UEs included in said set of UEs and that RU is capable of simultaneously transmitting to all of the UEs having that RU assigned thereto, said set of UEs can be scheduled to use the same time-frequency resources; and wherein otherwise the UEs having the same RUs assigned thereto cannot be scheduled to use the same time-frequency resources.

Example 59 includes the system of any of Examples 39-58, wherein each of the RUs is located remotely from the DU and at least one other RU.

Example 60 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising: scheduling a UE to make a set of reference signal transmissions; measuring, at each of a candidate set of two or more of the RUs, a respective received signal strength of each of the reference signal transmissions from said UE received using a respective at least one of a set of multiple beams; and determining, using the received signal strength measurements, a serving set of one or more of the RUs and a beam to serve said UE.

Example 61 includes the method of Example 60, wherein the set of reference transmissions comprises a set of Sounding Reference Signal (SRS) transmissions.

Example 62 includes the method of any of Examples 60-61, wherein the candidate set of two or more of the RUs includes one of: all of the RUs; and only the RUs in a neighborhood of said UE.

Example 63 includes the method of any of Examples 60-62, wherein the set of multiple beams includes one of: all of a set of predetermined beams the system is configured to use; and only those beams that said UE reported as having significant received signal strength during a most-recent bream-sweep process performed for said UE.

Example 64 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising: scheduling a UE to make a reference signal transmission; measuring, at each of a candidate set of two or more of the RUs, a respective received signal strength of the reference signal transmission from said UE received using an omni-directional or wide beam; and determining, using the received signal strength measurements, a serving set of one or more of the RUs to serve said UE.

Example 65 includes the method of Example 64, wherein the set of reference transmissions comprises a set of Sounding Reference Signal (SRS) transmissions.

Example 66 includes the method of any of Examples 64-65, wherein the candidate set of two or more of the RUs includes one of: all of the RUs; and only the RUs in a neighborhood of said UE.

Example 67 includes the method of any of Examples 64-66, wherein each of the serving set of one or more of the RUs used to serve said UE uses, to serve said UE, a beam determined by a most-recent bream-sweep process performed for said UE.

Example 68 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising: scheduling a UE to make a reference signal transmission using a directional transmission in a same direction as a beam for which said UE reported a highest received signal strength during a most-recent beam-sweeping process; measuring, at each of a candidate set of two or more of the RUs, a respective received signal strength of the reference signal transmission from said UE received using an omni-directional or wide beam; and determining, using the received signal strength measurements, a serving set of one or more of the RUs to serve said UE.

Example 69 includes the method of Example 68, wherein the set of reference transmissions comprises a set of Sounding Reference Signal (SRS) transmissions.

Example 70 includes the method of any of Examples 68-69, wherein the candidate set of two or more of the RUs includes one of: all of the RUs; and only the RUs in a neighborhood of said UE.

Example 71 includes the method of any of Examples 68-70, wherein each of the serving set of one or more of the RUs used to serve said UE uses, to serve said UE, a beam for which said UE reported the highest received signal strength during the most-recent beam-sweeping process.

Example 72 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising: scheduling each of a candidate set of two or more of the RUs to make reference signal transmissions using a set of multiple beams during time-frequency resources in which only that RU makes the reference signal transmissions; instructing a UE to separately report signal strength measurements of the reference signal transmissions from the RUs in the candidate set; receiving, at the system, the separate measurement reports from said UE made by said UE for the reference signal transmissions; and determining, using the measurements reports, a serving set of one or more of the RUs and a beam to serve said U E.

Example 73 includes the method of Example 72, wherein the set of reference transmissions comprises Channel Status Information Reference Signal (CSI-RS) transmissions.

Example 74 includes the system of any of Examples 72-73, wherein the candidate set of two or more of the RUs includes one of: all of the RUs; and only the RUs in a neighborhood of said UE.

Example 75 includes the method of any of Examples 72-74, wherein the set of multiple beams includes one of: all of a set of predetermined beams the system is configured to use; and only those beams that said UE reported as having significant received signal strength during a most-recent bream-sweep process performed for said UE.

Example 76 includes a method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising: assigning, to each UE included in a set of UEs, a respective RU-beam tuple that comprises a respective set of RUs used to serve that UE and a respective beam used to serve that UE; and determining if said set of UEs can be scheduled to use the same time-frequency resources by doing the following: determining if any UE included in said set of UEs has a RU-beam tuple assigned to that UE that is also assigned to one or more other UEs included in said set of UEs, wherein any UEs included in said set of UEs having the same RU-beam tuple assigned to those UEs cannot be scheduled to use the same time-frequency resources; if none of said set of UEs have the same RU-beam tuple assigned thereto, determining if the respective beam assigned to any of said set of UEs intersects the beam assigned to any of the other UEs included in said set of UEs, wherein any UEs included in said set of UEs having intersecting beams assigned thereto cannot be scheduled to use the same time-frequency resources; if none of said set of UEs have intersecting beams assigned thereto: determining if any UE included in said set of UEs has a RU assigned thereto that is also assigned to one or more other UEs included in said set of UEs; and if any UE included in said set of UEs has a RU assigned thereto that is also assigned to one or more other UEs included in said set of UEs, determining if that RU is capable of simultaneously transmitting to all of the UEs included in said set of UEs having that UE assigned thereto; wherein if it is determined that none of the UEs included in said set of UEs have the same RU assigned thereto, said set of UEs can be scheduled to use the same time-frequency resources; wherein if a UE included in said set of UEs has a RU assigned thereto that is also assigned to one or more other UEs included in said set of UEs and that RU is capable of simultaneously transmitting to all of the UEs having that RU assigned thereto, said set of UEs can be scheduled to use the same time-frequency resources; and wherein otherwise the UEs having the same RUs assigned thereto cannot be scheduled to use the same time-frequency resources.

What is claimed is:

1. A system for providing wireless service to user devices using a same cell, the system comprising:
 a distributed unit (DU) to communicatively couple the system to a core network, the DU configured to implement at least some LAYER 2 functions for a wireless interface and at least some LAYER 1 functions for the wireless interface; and
 a plurality of remote units (RUs), each of the RUs associated with a respective set of one or more antennas;
 wherein the system is configured to use all of the RUs to serve the same cell;
 wherein the system is configured to wirelessly transmit at least some user data to a first user device using a first subset of the RUs and a first beam, the first subset of the RUs including less than all of the RUs otherwise used to serve the same cell; and
 wherein the system is configured to determine which RUs are included in the first subset of RUs used to transmit said at least some user data to the first user device based on measurement reports made by the first user device of reference signal transmissions transmitted using multiple beams, at least some of the reference signal transmissions transmitted from less than all of the RUs.

2. The system of claim 1, wherein the DU is coupled to the plurality of RUs via at least one intermediary node.

3. The system of claim 2, wherein the intermediary node comprises an Ethernet switch.

4. The system of claim 1, wherein the reference signal transmissions comprise Channel Status Information Reference Signal (CSI-RS) transmissions.

5. The system of claim 1, wherein the first subset of RUs used to wirelessly transmit to the first user device changes.

6. The system of claim 1, wherein the system is further configured to wirelessly transmit at least some user data to a second user device using a second subset of the RUs and a second beam, the second subset of the RUs including less than all of the RUs otherwise used to serve the same cell; and
 wherein the system is further configured to determine which RUs are included in the second subset of RUs used to transmit said at least some user data to the second user device based on measurement reports made by the second user device of the reference signal transmissions transmitted using the multiple beams.

7. The system of claim 6, wherein the first subset of RUs differs from the second subset of RUs.

8. The system of claim 6, wherein the first beam differs from the second beam.

9. The system of claim 6, wherein the second subset of RUs used to wirelessly transmit to the second user device changes.

10. The system of claim 1, wherein each of the RUs is located remotely from the DU and at least one other RU.

11. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of user devices using the wireless interface and using beamforming, each of the RUs associated with a respective set of one or more antennas, wherein each RU is configured to implement the LAYER 1 functions for the wireless interface that are not implemented in the DU, wherein the DU and RUs are communicatively coupled to each other over a fronthaul, wherein the system is configured to use all of the RUs to serve the same cell, the method comprising:
 transmitting reference signals using the multiple beams, at least some of the reference signals transmitted from less than all of the RUs;
 receiving measurement reports made by a first user device of the reference signals;
 determining which RUs are included in a first subset of RUs, the first subset of the RUs including less than all of the RUs otherwise used to serve the same cell; and
 wirelessly transmitting at least some user data to the first user device using the first subset of the RUs and a first beam.

12. The method of claim 11, wherein the DU is coupled to the plurality of RUs via at least one intermediary node.

13. The method of claim 12, wherein the intermediary node comprises an Ethernet switch.

14. The method of claim 11, wherein the reference signals comprise Channel Status Information Reference Signal (CSI-RS) transmissions.

15. The method of claim 11, wherein the first subset of RUs used to wirelessly transmit to the first user device changes.

16. The method of claim 11, wherein the method further comprising:
 receiving measurement reports made by a second user device of the reference signals;

determining which RUs are included in a second subset of RUs, the second subset of the RUs including less than all of the RUs otherwise used to serve the same cell; and wirelessly transmitting at least some user data to the second user device using the second subset of the RUs and a second beam.

17. The method of claim 16, wherein the first subset of RUs differs from the second subset of RUs.

18. The method of claim 16, wherein the first beam differs from the second beam.

19. The method of claim 16, wherein the second subset of RUs used to wirelessly transmit to the second user device changes.

20. A system for providing wireless service to user devices using a same cell, the system comprising:
  a distributed unit (DU) to communicatively couple the system to a core network, the DU configured to implement at least some LAYER 2 functions for a wireless interface and at least some LAYER 1 functions for the wireless interface; and
  a plurality of remote units (RUs), each of the RUs associated with a respective set of one or more antennas;
  wherein the system is configured to use all of the RUs to serve the same cell;
  wherein the system is configured to wirelessly receiving at least some user data from a first user device using a first subset of the RUs and a first beam, the first subset of the RUs including less than all of the RUs otherwise used to serve the same cell; and
  wherein the system is configured to determine which RUs are included in the first subset of RUs used to receive said at least some user data from the first user device based on measurement reports made by the first user device of reference signal transmissions transmitted using multiple beams, at least some of the reference signal transmissions transmitted from less than all of the RUs.

21. The system of claim 20, wherein the DU is coupled to the plurality of RUs via at least one intermediary node.

22. The system of claim 21, wherein the intermediary node comprises an Ethernet switch.

23. The system of claim 20, wherein the reference signal transmissions comprise Channel Status Information Reference Signal (CSI-RS) transmissions.

24. The system of claim 20, wherein the first subset of RUs used to wirelessly receive from the first user device changes.

25. The system of claim 20, wherein the system is further configured to wirelessly receive at least some user data from a second user device using a second subset of the RUs and a second beam, the second subset of the RUs including less than all of the RUs otherwise used to serve the same cell; and
  wherein the system is further configured to determine which RUs are included in the second subset of RUs used to receive said at least some user data from the second user device based on measurement reports made by the second user device of the reference signal transmissions transmitted using the multiple beams.

26. The system of claim 25, wherein the first subset of RUs differs from the second subset of RUs.

27. The system of claim 25, wherein the first beam differs from the second beam.

28. The system of claim 25, wherein the second subset of RUs used to wirelessly receive from the second user device changes.

29. The system of claim 20, wherein each of the RUs is located remotely from the DU and at least one other RU.

30. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of user devices using the wireless interface and using beamforming, each of the RUs associated with a respective set of one or more antennas, wherein each RU is configured to implement the LAYER 1 functions for the wireless interface that are not implemented in the DU, wherein the DU and RUs are communicatively coupled to each other over a fronthaul, wherein the system is configured to use all of the RUs to serve the same cell, the method comprising:
  transmitting reference signals using multiple beams, at least some of the reference signals transmitted from less than all of the RUs;
  receiving measurement reports made by a first user device of the reference signals;
  determining which RUs are included in a first subset of RUs, the first subset of the RUs including less than all of the RUs otherwise used to serve the same cell; and
  wirelessly receiving at least some user data from the first user device using the first subset of the RUs and a first beam.

31. The method of claim 30, wherein the DU is coupled to the plurality of RUs via at least one intermediary node.

32. The method of claim 31, wherein the intermediary node comprises an Ethernet switch.

33. The method of claim 30, wherein the reference signals comprise Channel Status Information Reference Signal (CSI-RS) transmissions.

34. The method of claim 30, wherein the first subset of RUs used to wirelessly receive from the first user device changes.

35. The method of claim 30, wherein the method further comprises:
  receiving measurement reports made by a second user device of the reference signals;
  determining which RUs are included in a second subset of RUs, the second subset of the RUs including less than all of the RUs otherwise used to serve the same cell; and
  wirelessly receiving at least some user data from the second user device using the second subset of the RUs and a second beam.

36. The method of claim 35, wherein the first subset of RUs differs from the second subset of RUs.

37. The method of claim 35, wherein the first beam differs from the second beam.

38. The method of claim 35, wherein the second subset of RUs used to wirelessly receive from the second user device changes.

39. A system comprising:
  a distributed unit (DU) to communicatively couple to a core network, the DU configured to implement at least some LAYER 2 functions for a wireless interface and at least some LAYER 1 functions for the wireless interface; and
  a plurality of remote units (RUs) to wirelessly transmit and receive radio frequency signals to and from a plurality of items of user equipment (UEs) using the wireless interface and using beamforming, each of the RUs associated with a respective set of one or more antennas;

wherein each RU is configured to implement the LAYER 1 functions for the wireless interface that are not implemented in the DU;

wherein the DU and RUs are communicatively coupled to each other over a fronthaul;

wherein the DU is configured to determine a serving set of RUs that should be used to serve each of the UEs when beamforming is used;

wherein the system is configured to simultaneously communicate with multiple UEs using the same time-frequency resources; and wherein the system is configured to determine if a reuse set of UEs can be scheduled to use the same time-frequency resources based on the respective serving set of RUs used to serve each UE included in said reuse set of UEs and the respective beam used to serve each UE included in said reuse set of UEs.

40. The system of claim 39, wherein the system is configured to use at least one of: analog beamforming and digital beamforming.

41. The system of claim 39, wherein the system is configured to wireless communicate with the plurality of UEs using a Fifth Generation New Radio (5G NR) wireless interface.

42. The system of claim 39, wherein the system is configured to:
schedule a UE to make a set of reference signal transmissions;
measure, at each of a candidate set of two or more of the RUs, a respective received signal strength of each of the reference signal transmissions from said UE received using a respective at least one of a set of multiple beams; and
determine, using the received signal strength measurements, the respective serving set of one or more of the RUs and the respective beam to serve said UE.

43. The system of claim 42, wherein the set of reference transmissions comprises a set of Sounding Reference Signal (SRS) transmissions.

44. The system of claim 42, wherein the candidate set of two or more of the RUs includes one of:
all of the RUs; and
only the RUs in a neighborhood of said UE.

45. The system of claim 42, wherein the set of multiple beams includes one of:
all of a set of predetermined beams the system is configured to use; and
only those beams that said UE reported as having at least a predetermined level of received signal strength during a most-recent bream-sweep process performed for said UE.

46. The system of claim 39, wherein the system is configured to:
schedule a UE to make a reference signal transmission;
measure, at each of a candidate set of two or more of the RUs, a respective received signal strength of the reference signal transmission from said UE received using an omni-directional or wide beam; and
determine, using the received signal strength measurements, the respective serving set of one or more of the RUs to serve said UE.

47. The system of claim 46, wherein the set of reference transmissions comprises a set of Sounding Reference Signal (SRS) transmissions.

48. The system of claim 46, wherein the candidate set of two or more of the RUs includes one of:
all of the RUs; and
only the RUs in a neighborhood of said UE.

49. The system of claim 46, wherein each of the serving set of one or more of the RUs used to serve said UE uses, to serve said UE, the beam determined by a most-recent bream-sweep process performed for said UE.

50. The system of claim 39, wherein the system is configured to:
schedule a UE to make a reference signal transmission using a directional transmission in a same direction as a beam for which said UE reported a highest received signal strength during a most-recent beam-sweeping process;
measure, at each of a candidate set of two or more of the RUs, a respective received signal strength of the reference signal transmission from said UE received using an omni-directional or wide beam; and
determine, using the received signal strength measurements, the serving set of one or more of the RUs to serve said UE.

51. The system of claim 50, wherein the set of reference transmissions comprises a set of Sounding Reference Signal (SRS) transmissions.

52. The system of claim 50, wherein the candidate set of two or more of the RUs includes one of:
all of the RUs; and
only the RUs in a neighborhood of said UE.

53. The system of claim 50, wherein each of the serving set of one or more of the RUs used to serve said UE uses, to serve said UE, the beam for which said UE reported the highest received signal strength during the most-recent beam-sweeping process.

54. The system of claim 39, wherein the system is configured to:
schedule each of a candidate set of two or more of the RUs to make reference signal transmissions using a set of multiple beams during time-frequency resources in which only that RU makes the reference signal transmissions;
instruct a UE to separately report signal strength measurements of the reference signal transmissions from the RUs in the candidate set;
receive, at the system, the separate measurement reports from said UE made by said UE for the reference signal transmissions; and
determine, using the measurements reports, the respective serving set of one or more of the RUs and the respective beam to serve said UE.

55. The system of claim 54, wherein the set of reference transmissions comprises Channel Status Information Reference Signal (CSI-RS) transmissions.

56. The system of claim 54, wherein the candidate set of two or more of the RUs includes one of:
all of the RUs; and
only the RUs in a neighborhood of said UE.

57. The system of claim 54, wherein the set of multiple beams includes one of:
all of a set of predetermined beams the system is configured to use; and
only those beams that said UE reported as having at least a predetermined level of received signal strength during a most-recent bream-sweep process performed for said UE.

58. The system of claim 39, wherein each of said set of UEs has a respective RU-beam tuple assigned to that UE that comprises the respective set of RUs used to serve that UE and the respective beam used to serve that UE; and
  wherein the system is configured to determine if said set of UEs can be scheduled to use the same time-frequency resources based on the respective set of RUs used to serve each UE included in said set of UEs and the respective beam used to serve each UE included in said set of UEs by doing the following:
    determining if any UE included in said set of UEs has a RU-beam tuple assigned to that UE that is also assigned to one or more other UEs included in said set of UEs, wherein any UEs included in said set of UEs having the same RU-beam tuple assigned to those UEs cannot be scheduled to use the same time-frequency resources;
    if none of said set of UEs have the same RU-beam tuple assigned thereto, determining if the respective beam assigned to any of said set of UEs intersects the beam assigned to any of the other UEs included in said set of UEs, wherein any UEs included in said set of UEs having intersecting beams assigned thereto cannot be scheduled to use the same time-frequency resources;
    if none of said set of UEs have intersecting beams assigned thereto:
      determining if any UE included in said set of UEs has a RU assigned thereto that is also assigned to one or more other UEs included in said set of UEs; and
      if any UE included in said set of UEs has a RU assigned thereto that is also assigned to one or more other UEs included in said set of UEs, determining if that RU is capable of simultaneously transmitting to all of the UEs included in said set of UEs having that UE assigned thereto;
    wherein if it is determined that none of the UEs included in said set of UEs have the same RU assigned thereto, said set of UEs can be scheduled to use the same time-frequency resources;
    wherein if a UE included in said set of UEs has a RU assigned thereto that is also assigned to one or more other UEs included in said set of UEs and that RU is capable of simultaneously transmitting to all of the UEs having that RU assigned thereto, said set of UEs can be scheduled to use the same time-frequency resources; and
    wherein otherwise the UEs having the same RUs assigned thereto cannot be scheduled to use the same time-frequency resources.

59. The system of claim 39, wherein each of the RUs is located remotely from the DU and at least one other RU.

60. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising:
  scheduling a UE to make a set of reference signal transmissions;
  measuring, at each of a candidate set of two or more of the RUs, a respective received signal strength of each of the reference signal transmissions from said UE received using a respective at least one of a set of multiple beams; and
  determining, using the received signal strength measurements, a serving set of one or more of the RUs and a beam to serve said UE.

61. The method of claim 60, wherein the set of reference transmissions comprises a set of Sounding Reference Signal (SRS) transmissions.

62. The method of claim 60, wherein the candidate set of two or more of the RUs includes one of:
  all of the RUs; and
  only the RUs in a neighborhood of said UE.

63. The method of claim 60, wherein the set of multiple beams includes one of:
  all of a set of predetermined beams the system is configured to use; and
  only those beams that said UE reported as having at least a predetermined level of received signal strength during a most-recent bream-sweep process performed for said UE.

64. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising:
  scheduling a UE to make a reference signal transmission;
  measuring, at each of a candidate set of two or more of the RUs, a respective received signal strength of the reference signal transmission from said UE received using an omni-directional or wide beam; and
  determining, using the received signal strength measurements, a serving set of one or more of the RUs to serve said UE.

65. The method of claim 64, wherein the set of reference transmissions comprises a set of Sounding Reference Signal (SRS) transmissions.

66. The method of claim 64, wherein the candidate set of two or more of the RUs includes one of:
  all of the RUs; and
  only the RUs in a neighborhood of said UE.

67. The method of claim 64, wherein each of the serving set of one or more of the RUs used to serve said UE uses, to serve said UE, a beam determined by a most-recent bream-sweep process performed for said UE.

68. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising:
  scheduling a UE to make a reference signal transmission using a directional transmission in a same direction as a beam for which said UE reported a highest received signal strength during a most-recent beam-sweeping process;
  measuring, at each of a candidate set of two or more of the RUs, a respective received signal strength of the reference signal transmission from said UE received using an omni-directional or wide beam; and
  determining, using the received signal strength measurements, a serving set of one or more of the RUs to serve said UE.

69. The method of claim 68, wherein the set of reference transmissions comprises a set of Sounding Reference Signal (SRS) transmissions.

70. The method of claim 68, wherein the candidate set of two or more of the RUs includes one of:
  all of the RUs; and
  only the RUs in a neighborhood of said UE.

71. The method of claim 68, wherein each of the serving set of one or more of the RUs used to serve said UE uses, to serve said UE, a beam for which said UE reported the highest received signal strength during the most-recent beam-sweeping process.

72. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising:
  scheduling each of a candidate set of two or more of the RUs to make reference signal transmissions using a set of multiple beams during time-frequency resources in which only that RU makes the reference signal transmissions;
  instructing a UE to separately report signal strength measurements of the reference signal transmissions from the RUs in the candidate set;
  receiving, at the system, the separate measurement reports from said UE made by said UE for the reference signal transmissions; and
  determining, using the measurements reports, a serving set of one or more of the RUs and a beam to serve said UE.

73. The method of claim 72, wherein the set of reference transmissions comprises Channel Status Information Reference Signal (CSI-RS) transmissions.

74. The system of claim 72, wherein the candidate set of two or more of the RUs includes one of:
  all of the RUs; and
  only the RUs in a neighborhood of said UE.

75. The method of claim 72, wherein the set of multiple beams includes one of:
  all of a set of predetermined beams the system is configured to use; and
  only those beams that said UE reported as having significant received signal strength during a most-recent bream-sweep process performed for said UE.

76. A method performed using a system comprising: a distributed unit (DU) to communicatively couple to a core network, the DU configured to implement at least some LAYER 2 functions for a wireless interface and at least some LAYER 1 functions for the wireless interface; and a plurality of remote units (RUs) to wirelessly transmit and receive radio frequency signals to and from a plurality of items of user equipment (UEs) using the wireless interface and using beamforming, each of the RUs associated with a respective set of one or more antennas, wherein each RU is configured to implement the LAYER 1 functions for the wireless interface that are not implemented in the DU; wherein the DU and RUs are communicatively coupled to each other over a fronthaul, the method comprising:
  assigning, to each UE included in a set of UEs, a respective RU-beam tuple that comprises a respective set of RUs used to serve that UE and a respective beam used to serve that UE; and
  determining if said set of UEs can be scheduled to use the same time-frequency resources by doing the following:
    determining if any UE included in said set of UEs has a RU-beam tuple assigned to that UE that is also assigned to one or more other UEs included in said set of UEs, wherein any UEs included in said set of UEs having the same RU-beam tuple assigned to those UEs cannot be scheduled to use the same time-frequency resources;
    if none of said set of UEs have the same RU-beam tuple assigned thereto, determining if the respective beam assigned to any of said set of UEs intersects the beam assigned to any of the other UEs included in said set of UEs, wherein any UEs included in said set of UEs having intersecting beams assigned thereto cannot be scheduled to use the same time-frequency resources;
    if none of said set of UEs have intersecting beams assigned thereto:
      determining if any UE included in said set of UEs has a RU assigned thereto that is also assigned to one or more other UEs included in said set of UEs; and
      if any UE included in said set of UEs has a RU assigned thereto that is also assigned to one or more other UEs included in said set of UEs, determining if that RU is capable of simultaneously transmitting to all of the UEs included in said set of UEs having that UE assigned thereto;
      wherein if it is determined that none of the UEs included in said set of UEs have the same RU assigned thereto, said set of UEs can be scheduled to use the same time-frequency resources;
      wherein if a UE included in said set of UEs has a RU assigned thereto that is also assigned to one or more other UEs included in said set of UEs and that RU is capable of simultaneously transmitting to all of the UEs having that RU assigned thereto, said set of UEs can be scheduled to use the same time-frequency resources; and
      wherein otherwise the UEs having the same RUs assigned thereto cannot be scheduled to use the same time-frequency resources.

* * * * *